United States Patent
Venna et al.

(10) Patent No.: US 10,176,445 B2
(45) Date of Patent: Jan. 8, 2019

(54) RELATIONSHIPS AMONG TECHNOLOGY ASSETS AND SERVICES AND THE ENTITIES RESPONSIBLE FOR THEM

(71) Applicant: BitSight Technologies, Inc., Cambridge, MA (US)

(72) Inventors: Nagarjuna Venna, Waltham, MA (US); David Feinzeig, Stoneham, MA (US); Amy Eastment, Somerville, MA (US); Daniel Dahlberg, Cambridge, MA (US); Stephen Boyer, Waltham, MA (US); Philip John Steuart Gladstone, Carlisle, MA (US); Mathew Cherian, Bedford, MA (US)

(73) Assignee: BitSight Technologies, Inc., Cambridge, MA (US)

( * ) Notice: Subject to any disclaimer, the term of this patent is extended or adjusted under 35 U.S.C. 154(b) by 0 days.

(21) Appl. No.: 15/089,375

(22) Filed: Apr. 1, 2016

(65) Prior Publication Data
US 2017/0236079 A1    Aug. 17, 2017

Related U.S. Application Data

(63) Continuation of application No. 15/044,952, filed on Feb. 16, 2016.

(51) Int. Cl.
| | |
|---|---|
| *G06Q 10/06* | (2012.01) |
| *H04L 29/12* | (2006.01) |
| *G06F 3/0481* | (2013.01) |
| *G06Q 40/08* | (2012.01) |
| *G06F 3/0484* | (2013.01) |
| *G06F 17/30* | (2006.01) |

(52) U.S. Cl.
CPC ....... *G06Q 10/0635* (2013.01); *G06F 3/0481* (2013.01); *G06F 3/0484* (2013.01); *G06F 17/30398* (2013.01); *G06F 17/30867* (2013.01); *G06Q 40/08* (2013.01); *H04L 61/2007* (2013.01); *H04L 61/6068* (2013.01)

(58) Field of Classification Search
CPC .................. G06Q 10/0635; H04L 31/2007
See application file for complete search history.

(56) References Cited

U.S. PATENT DOCUMENTS

| | | | |
|---|---|---|---|
| 5,867,799 A | 2/1999 | Lang et al. | |
| 6,016,475 A * | 1/2000 | Miller | G06F 17/30867 705/26.7 |
| 6,792,401 B1 | 9/2004 | Nigro et al. | |
| 7,100,195 B1 * | 8/2006 | Underwood | G06F 9/4443 707/999.009 |

(Continued)

OTHER PUBLICATIONS

"Agreed Upon Procedures," Version 4.0, BITS, The Financial Institution Shared Assessments Program, Assessment Guide, Sep. 2008, 56 pages.

(Continued)

*Primary Examiner* — Simon P Kanaan
(74) *Attorney, Agent, or Firm* — Goodwin Procter LLP

(57) ABSTRACT

Among other things, information is obtained by computer about Internet-related assets of organizations. The information is used to identify relationships between the organizations with respect to the assets. The information about the identified relationships is made available for display or analysis or both.

21 Claims, 22 Drawing Sheets

(56) References Cited

U.S. PATENT DOCUMENTS

| | | | |
|---|---|---|---|
| 7,194,769 B2 | 3/2007 | Lippmann et al. | |
| 7,290,275 B2 | 10/2007 | Baudoin et al. | |
| 7,748,038 B2* | 6/2010 | Olivier | H04L 63/145 713/188 |
| 7,971,252 B2 | 6/2011 | Lippmann et al. | |
| 8,429,630 B2 | 4/2013 | Nickolov et al. | |
| 8,504,556 B1 | 8/2013 | Rice et al. | |
| 9,053,210 B2* | 6/2015 | Elnikety | G06F 17/30958 |
| 9,244,899 B1* | 1/2016 | Greenbaum | G06Q 40/00 |
| 9,424,333 B1* | 8/2016 | Bisignani | G06F 17/30592 |
| 9,646,110 B2* | 5/2017 | Byrne | G06F 17/30979 |
| 2001/0044798 A1 | 11/2001 | Nagral et al. | |
| 2002/0083077 A1 | 6/2002 | Vardi | |
| 2003/0050862 A1 | 3/2003 | Bleicken et al. | |
| 2003/0123424 A1 | 7/2003 | Jung | |
| 2004/0010709 A1 | 1/2004 | Baudoin et al. | |
| 2004/0024859 A1 | 2/2004 | Bloch et al. | |
| 2004/0133561 A1 | 7/2004 | Burke | |
| 2004/0193918 A1* | 9/2004 | Green | H04L 63/1433 726/22 |
| 2004/0199791 A1 | 10/2004 | Poletto et al. | |
| 2004/0199792 A1 | 10/2004 | Tan et al. | |
| 2004/0221296 A1* | 11/2004 | Ogielski | H04L 12/24 719/313 |
| 2004/0250122 A1* | 12/2004 | Newton | H04L 63/1425 726/2 |
| 2004/0250134 A1 | 12/2004 | Kohler et al. | |
| 2005/0071450 A1 | 3/2005 | Allen et al. | |
| 2005/0080720 A1* | 4/2005 | Betz | G06Q 40/08 705/38 |
| 2005/0108415 A1* | 5/2005 | Turk | H04L 63/1491 709/232 |
| 2005/0131830 A1 | 6/2005 | Juarez et al. | |
| 2005/0138413 A1 | 6/2005 | Lippmann et al. | |
| 2006/0173992 A1 | 8/2006 | Weber et al. | |
| 2006/0212925 A1* | 9/2006 | Shull | G06F 21/55 726/1 |
| 2007/0067845 A1* | 3/2007 | Wiemer | G06F 21/577 726/25 |
| 2007/0143851 A1 | 6/2007 | Nicodemus et al. | |
| 2007/0282730 A1 | 12/2007 | Carpenter et al. | |
| 2008/0047018 A1 | 2/2008 | Baudoin et al. | |
| 2008/0091834 A1* | 4/2008 | Norton | G06Q 10/00 709/229 |
| 2008/0140495 A1 | 6/2008 | Bhamidipaty et al. | |
| 2008/0162931 A1 | 7/2008 | Lord et al. | |
| 2008/0209565 A2 | 8/2008 | Baudoin et al. | |
| 2009/0044272 A1 | 2/2009 | Jarrett | |
| 2009/0193054 A1 | 7/2009 | Karimisetty et al. | |
| 2009/0265787 A9 | 10/2009 | Baudoin et al. | |
| 2009/0293128 A1 | 11/2009 | Lippmann et al. | |
| 2010/0262444 A1 | 10/2010 | Atwal et al. | |
| 2011/0185403 A1 | 7/2011 | Dolan et al. | |
| 2011/0231395 A1* | 9/2011 | Vadlamani | G06F 17/30654 707/723 |
| 2012/0158725 A1 | 6/2012 | Molloy et al. | |
| 2012/0166458 A1 | 6/2012 | Laudanski et al. | |
| 2014/0019196 A1* | 1/2014 | Wiggins | G06Q 10/0635 705/7.28 |
| 2014/0108474 A1 | 4/2014 | David et al. | |
| 2014/0204803 A1 | 7/2014 | Nguyen et al. | |
| 2015/0074579 A1 | 3/2015 | Gladstone et al. | |
| 2015/0310188 A1 | 10/2015 | Ford et al. | |
| 2016/0140466 A1* | 5/2016 | Sidebottom | G06Q 10/0635 705/7.28 |

OTHER PUBLICATIONS

"An Executive View ofIT Governance," IT Governance Institute, 2009, 32 pages.

"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.

"Assuring a Trusted and Resilient Information and Communications Infrastructure," Cyberspace Policy Review, May 2009, 76 pages.

"Master Security Criteria," Version 3.0, BITS Financial Services Security Laboratory, Oct. 2001, 47 pages.

"Plugging the Right Holes," Lab Notes, MIT Lincoln Library, Posted Jul. 2008, retrieved Sep. 14, 2010 from http://www. I I .miLedufpublicationsflabnotesfpluggingtherightho ! . . . , 2 pages.

"Report on Controls Placed in Operation and Test of Operating Effectiveness," EasCorp, Jan. 1-Dec. 31, 2008, prepared by Crowe Horwath, 58 pages.

"Shared Assessments: Getting Started," BITS, 2008, 4 pages.

"Twenty Critical Controls for Effective Cyber Defense: Consensus Audit," Version 2.3, Nov. 13, 2009, retrieved on Apr. 9, 2010 from http://www.sans.org/critical-security-controls/print.php.

2009 Data Breach Investigations Report, study conducted by Verizon Business RISK Team, 52 pages.

Artz, Michael Lyle, "NetSPA: A Network Security Planning Architecture," Massachusetts Institute of Technology, May 24, 2002, 97 pages.

Boyer, Stephen, et al., Playing with Blocks: SCAP—Enable Higher-Level Analyses, MIT Lincoln Laboratory, 5th Annual IT Security Automation Conference, Oct. 26-29, 2009, 35 pages.

Browne, Niall, et al., "Shared Assessments Program AUP and SAS70 Frequently Asked Questions," BITS, 4 pages.

Buckshaw, Donald L., "Use of Decision Support Techniques for Information System Risk Management," submitted for publication in Wiley's Encyclopedia of Quantitative Risk Assessment in Jan. 2007, 11 pages.

Buehler, Kevin S., et al., "Running with risk," The McKinsey Quarterly, No. 4, 2003, pages. 40-49.

Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.

Computer Network Graph-Bees, http://bioteams.com/2007/04/30/visualizing_complex_networks.html, date accessed Sep. 28, 2016.

Computer Network Graph-Univ. of Michigan, http://people.cst.cmich.edu/liao1q/research.shtml, date accessed Sep. 28, 2016.

Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.

Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.

Dillon-Merrill, PhD., Robin L, et al., "Logic Trees: Fault, Success, Attack, Event, Probability, and Decision Trees," Wiley Handbook of Science and Technology for Homeland Security, 13 pages.

Dun & Bradstreet Corp. Stock Report, Standard & Poor's, Jun. 6, 2009, 8 pages.

Dun & Bradstreet, the DUNSRight Quality Process: Power Behind Quality Information, 24 pages.

Edmonds, Robert, "ISC Passive DNS Architecture", Internet Systems Consortium, Inc., Mar. 2012 18 pages.

Equifax Inc. Stock Report, Standard & Poor's, Jun. 6, 2009, 8 pages.

Hacking Exposed 6, S. McClure et al., copyright 2009, 37 pages.

Ingols, Kyle, et al., "Modeling Modern Network Attacks and Countermeasures Using Attack Graphs," MIT Lincoln Laboratory, 16 pages.

Ingols, Kyle, et al., "Practical Attack Graph Generation for Network Defense," MIT Lincoln Library, IEEE Computer Society, Proceedings of the 22nd Annual Computer Security Applications Conference (ASCAC'06), 2006, 10 pages.

Ingols, Kyle, et al., "Practical Experiences Using SCAP to Aggregate CND Data," MIT Lincoln . Library, Presentation to NIST SCAP Conference, Sep. 24, 2008, 59 pages.

Johnson, Eric, et al., "Information Risk and the Evolution of the Security Rating Industry," Mar. 24, 2009, 27 pages.

Lippmann, RP., et al., "An Annotated Review of Papers on Attack Graphs," Project Report IA-1, Lincoln Laboratory, Massachusetts Institute of Technology, Mar. 31, 2005, 39 pages.

(56) References Cited

OTHER PUBLICATIONS

Lippmann, RP., et al., "Evaluating and Strengthening Enterprise Network Security Using Attack Graphs," Project Report IA-2, MIT Lincoln Laboratory, Oct. 5, 2005, 96 pages.
Lippmann, Rich, et al., NetSPA: A Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
MaxMind, https://www.maxmind.com/en/about-maxmind, https://www.maxmind.com/en/geoip2-isp-database, date accessed Sep. 28, 20116, 3 pages.
Method Documentation, CNSS Risk Assessment Tool Version 1.1, Mar. 31, 2009, 24 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 ppages.
Nye, John, "Avoiding Audit Overlap," Moody's Risk Services, Presentation, Source Boston, Mar. 14, 2008, 19 pages.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pags.
Rare Events, Oct. 2009, Jason, The Mitre Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wikipedia, https://en.wikipedia.org/wiki/Crowdsourcing, date accessed Sep. 28, 2016.
Williams, Leevar, et al., "GARNET: A Graphical Attack Graph and Reachability Network Evaluation Tool," MIT Lincoln Library, VizSEC 2009, pp. 44-59.
Williams, Leevar, et al., "An Interactive Attack Graph Cascade and Reachability Display," MIT Lincoln Laboratory, 17 pages.
"Gephi (gephi.org)," accessed on the internet at https://web.archive.org/web/20151216223216/https://gephi.orgi; Dec. 16, 2015; 1 page.
"mile 2 CPTE Maltego Demo," accessed on the internet at http://www.youtube.com/watch?v=o2oNKOUzP0U; Jul. 12, 2012; 1 page.
"Neo4j (neo4j.com)," accessed on the internet at https://web.archive.org/web/20151220150341/http://neo4j.com:80/developer/guide-data-visualization/; Dec. 20, 2015; 1 page.
"Creating Transparency with Palantir," accessed on the internet at https://www.youtube.com/watch?v=8cbGChfagUA; Jul. 5, 2012, 1 page.
"Palantir Cyber: Uncovering malicious behavior at petabyte scale," accessed on the internet at https://www.youtube.com/watch?v=_EhYezVO6EE; Dec. 21, 2012; 1 pages.
Borgatti, et al., "On Social Network Analysis in a Supply Chain Context," Journal of Supply Chain Management; 45(2): 5-22; Apr. 2009.
Carstens, et al., "Modeling Company Risk and Importance in Supply Graphs," European Semantic Web Conference 2017: The Semantic Web pp. 18-31.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Jean, "Cyber Security: How to use graphs to do an attack analysis," accessed on the internet at https://linkurio.us/blog/cyber-security-use-graphs-attack-analysis/; Aug. 2014, 11 pages.
"Palantir.com," accessed on the internet at http://www.palantir.com/; Dec. 2015; 1 page.
Kc Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisation-with-bgplay), Sep. 30, 2015, 8 pages.
Noel, et al., "Big-Data Architecture for Cyber Attack Graphs, Representing Security Relationships in NoSQL Graph Databases," The MITRE Corporation, 2014, 6 pages.
Wagner, et al., "Assessing the vulnerability of supply chains using graph theory," Int. J. Production Economics 126 (2010) 121-129.
Moradi, et al., "Quantitative Models for Supply Chain Management," IGI Global, 2012, 29 pages.
Joslyn, et al., "Massive Scale Cyber Traffic Analysis: A Driver for Graph Database Research," Proceedings of the First International Workshop on Graph Data Management Experience and Systems (Grades 2013), 6 pages.
"About Neo4j," 1 page.
"Amazon Mechanical Turk," accessed on the internet at https://www.mturk.com/; 7 pages.
"Rapid7 Nexpose Vulnerability Scanner," accessed on the internet at https://www.rapid7.com/products/nexpose/download/, 3 pages.
"Tenable Nessus Network Vulnerability Scanner," accessed on the internet at https://www.tenable.com/products/nessus/nessus-professional; 13 pages.
"Computer Network Graph," http://www.opte.org; 1 page.
McNab, "Network Security Assessment," copyright 2004, 56 pages.

* cited by examiner

```
GET / HTTP /1.1
Host: www.example.com
Connection: keep-alive
Accept: text/html,application/xhtml+xml,application/xml
User-Agent: Mozilla/5.0 (Macintosh; Intel mac OS X
10_9_5) AppleWebKit/537.36 ((KHTML, like Gecko)
Chrome/48.0.2564.109 Safari/537.36
Accept-Encoding: gzip, deflate, sdch
Accept-Language: en-US, en;q=0.8
```

FIG. 21

Portfolio Companies (22)

Clear Selected  Filter by: [All Industries ▼]  [Search by name]

| View 4th Parties | Portfolio Company | Industry | Total 4th Party Service Providers |
|---|---|---|---|
| ☐ | Portfolio Company 1 | Finance | 44 |
| ☐ | Portfolio Company 2 | Business Services | 41 |
| ☐ | Portfolio Company 3 | Finance | 39 |
| ■ | Portfolio Company 4 | Technology | 38 |
| ■ | Portfolio Company 5 | Technology | 32 |
| ☐ | Portfolio Company 6 | Technology | 30 |
| ☐ | Portfolio Company 7 | Business Services | 29 |
| ☐ | Portfolio Company 8 | Finance | 27 |
| ☐ | Portfolio Company 9 | Finance | 25 |
| ☐ | Portfolio Company 10 | Finance | 23 |
| ☐ | Portfolio Company 11 | Technology | 20 |
| ☐ | Portfolio Company 12 | Retail | 20 |
| ☐ | Portfolio Company 13 | Retail | 20 |

Clear selections & view Portfolio Overview

4th Parties Dependencies
2 Companies Selected

● Critical Ecosystem Saturation: [≥50% ▼]

43 Results  Filter by: [All Service Types ▼]

| | Service Provider | Service Type | % of Impacted Assets | Total Impacted Assets |
|---|---|---|---|---|
| 4th Party 1 | | Web Hosting Provider | 88% ● | 1,445,135 |
| 4th Party 2 | | Web hosting Provider | 75% ● | 1,000,124 |
| 4th Party 3 | | Certificate Authority | 71% ● | 98,245 |
| 4th Party 4 | | DNS Provider | 68% ● | 92,765 |
| 4th Party 5 | | Telecommunications | 55% ● | 86,798 |
| 4th Party 6 | | Web Hosting Provider | 51% ● | 84,956 |
| 4th Party 7 | | Certificate authority | 48% | 82,924 |
| 4th Party 8 | | Certificate authority | 44% | 78,235 |
| 4th Party 9 | | DNS Provider | 40% | 65,325 |
| 4th Party 10 | | Web Hosting Provider | 40% | 65,124 |
| 4th Party 11 | | Web Hosting Provider | 33% | 60,876 |

FIG. 22

Portfolio Companies (22)

Clear Selected  Filter by: [All Industries ▾]  [Search by name]

| View Portfolio Dependencies | Service Provider | Service Type | Ecosystem Saturation (%) | Total 4th Party Service Providers |
|---|---|---|---|---|
| ☐ | 4th Party 1 | Web Hosting Provider | 77% ● | 44 |
| ■ | 4th Party 2 | Certificate Authority | 64% ● | 41 |
| ■ | 4th Party 3 | Certificate Authority | 59% ● | 39 |
| ☐ | 4th Party 4 | Web hosting Provider | 55% ● | 38 |
| ☐ | 4th Party 5 | DNS Provider | 50% ● | 32 |
| ☐ | 4th Party 6 | Web Hosting | 50% ● | 30 |
| ☐ | 4th Party 7 | Certificate Authority | 45% | 29 |
| ☐ | 4th Party 8 | Web Hosting | 41% | 27 |
| ☐ | 4th Party 9 | Web Hosting | 47% | 25 |
| ☐ | 4th Party 10 | Web Hosting | 36% | 23 |
| ☐ | 4th Party 11 | Web Hosting | 36% | 20 |
| ☐ | 4th Party 12 | Web Hosting | 30% | 20 |

4th Parties Dependencies
2 Companies Selected

14 Results  Filter by: [All Industries ▾]

| Portfolio Company | Asset Risk (%) | Total Impacted Assets |
|---|---|---|
| Portfolio Company 1 | 75% | 22,134 |
| Portfolio Company 2 | 72% | 20,146 |
| Portfolio Company 3 | 66% | 54,234 |
| Portfolio Company 4 | 63% | 101,567 |
| Portfolio Company 5 | 59% | 177,241 |
| Portfolio Company 6 | 51% | 11,124 |
| Portfolio Company 7 | 50% | 10,542 |
| Portfolio Company 8 | 48% | 6,124 |
| Portfolio Company 9 | 46% | 10,241 |
| Portfolio Company 10 | 40% | 983,123 |
| Portfolio Company 11 | 40% | 242 |

ⓘ Knowledge DB

Knowledge DB

4th Parties are the visible deppendencies of companies in your portfolio. They include entities such as:

-Sub-contractors
-Service Providers
-Registrars
-Web Hosting Service Providers
-Certificate Authorities Learn more about 4th Party Ecosystems ⊗ help content, etc

RELATIONSHIPS AMONG TECHNOLOGY ASSETS AND SERVICES AND THE ENTITIES RESPONSIBLE FOR THEM

This application is a continuation application and claims priority under 35 U.S.C. § 120 to U.S. application Ser. No. 15/044,952, filed Feb. 16, 2016, entitled "Relationships Among Technology Assets And Services And The Entities Responsible For Them", which is hereby incorporated herein in its entirety by reference.

BACKGROUND

This application relates to U.S. patent application Ser. No. 14/021,585, filed Sep. 9, 2013; Ser. No. 13/240,572, filed Sep. 22, 2011; and Ser. No. 14/944,484, filed Nov. 18, 2015, the entire contents of all of which are incorporated here by reference.

This description relates to relationships among technology assets and services and the entities responsible for them.

The relationships, for example, among domain names, IP addresses, websites hosting services, email services, and the companies who own and provide them are complex. Risks of interacting with or doing business with such assets, services, and entities, depend in complicated ways on the relationships.

SUMMARY

In general, in an aspect, through an interactive graphical user interface or an API, controls are displayed that can be invoked by a user to obtain information from a graph database that stores nodes and edges. The nodes and edges are associated with entities or assets of entities and relationships among the entities or assets. The displayed controls enable a user to cause a corresponding database query to be applied to the graph database without the user having to formulate or edit the database query. The nodes and edges that are a result of applying the query to the graph database are displayed graphically.

Implementations may include one or any combination of two or more of the following features. The graph database includes information that was automatically derived from sources external to the entities. The graph database includes information that was derived from two or more sources. The graph database includes information that was derived from publicly available documents. The publicly available documents include public filings, disclosures, or resumes. The displayed controls include predetermined natural language questions that can be invoked by the user to cause a corresponding database query to be applied to the graph database. The questions are phrased in business terms. The questions are not phrased solely using attributes of the graph database. Each of the questions is mapped to the corresponding database query. The entities associated with the nodes belong to a portfolio of entities with which an entity associated with the user has or may have business relationships. The displayed controls include filter controls that enable a user to alter the database query without having to formulate or edit the database query. The displayed controls that can be invoked by the user and the corresponding database query are prearranged to force a limitation on a number of nodes that are returned by the database query and are displayed graphically to the user. The limitation forced on the number of nodes includes a limitation on parent nodes. For some nodes that are the result of applying the database query, the nodes are not displayed graphically. Information about the nodes is displayed as text. The text is displayed in a table. The table includes text associated with multiple nodes. The nodes about which the information is displayed as text include child nodes. The displaying of the nodes and edges that are the result of applying the query changes dynamically as the user invokes the displayed controls.

In general, in an aspect, through an interactive graphical user interface, a display device displays controls that can be invoked by a user to obtain information from a graph database. A storage device stores the graph database including nodes and edges associated with entities or assets of entities and relationships among the entities or assets. A processor receives invocations of the displayed controls and causes a corresponding database query to be applied to the graph database without the user having to formulate or edit the database query. The display device graphically displays nodes and edges that are a result of applying the query to the graph database.

Implementations may include one or any combination of two or more of the following features. The displayed controls include predetermined natural language questions that can be invoked by the user to cause a corresponding database query to be applied to the graph database. The questions are phrased in business terms. The questions are not phrased solely using attributes of the graph database. Each of the questions is mapped to the corresponding database query. The entities associated with the nodes belong to a portfolio of entities with which an entity associated with the user has or may have business relationships. The displayed controls include filter controls that enable a user to alter the database query without having to formulate or edit the database query. The displayed controls that can be invoked by the user and the corresponding database query are prearranged to force a limitation on a number of nodes that are returned by the database query and are displayed graphically to the user. The limitation forced on the number of nodes includes a limitation on parent nodes. For some nodes that are the result of applying the database query, the nodes are not displayed graphically. Information about the nodes is displayed as text. The text is displayed in a table. The table includes text associated with multiple nodes. The nodes about which the information is displayed as text include child nodes. The displaying of the nodes and edges that are the result of applying the query changes dynamically as the user invokes the displayed controls.

In general, in an aspect, through an interactive graphical user interface, controls are displayed that can be invoked by a user to obtain information from a graph database. There is a means for storing the graph database including nodes and edges associated with entities or assets of entities and relationships among the entities or assets. There is a means for receiving invocations of the displayed controls and causing a corresponding database query to be applied to the graph database without the user having to formulate or edit the database query. There is a means for graphically displaying nodes and edges that are a result of applying the query to the graph database.

In general, in an aspect, information is received that is indicative of service relationships between (a) each business entity that belongs to a portfolio of business entities, and (b) other business entities. The service relationships are identified based on the received information. Based on the identified service relationships, information is displayed that is indicative of a business risk to an entity that is associated with the portfolio. The business risk is related to the identified service relationships.

Implementations may include one or any combination of two or more of the following features. The received information was automatically derived from sources external to the entities. The received information was derived from two or more sources. The received information was derived from publicly available documents. The publicly available documents comprise public filings, disclosures, or resumes. The portfolio includes business entities with which the entity associated with the portfolio has business relationships. The business risk is associated with one of the other business entities having service relationships with more than one of the portfolio business entities. The business risk includes a service outage by one of the other business entities. The business risk includes a technology breach with respect to one of the other business entities. The business risk comprises a supply chain interruption related to geography. The displayed information is indicative of an extent of the business risk. The displayed information includes a graph of nodes representing business entities and edges representing relationships among the business entities. The nodes of the displayed information include nodes representing the business entities that belong to the portfolio. The displayed information includes information organized based on a scope of the aggregate risk. The displayed information includes information organized based on a type of the service relationship. The displayed information includes information indicative of a scope of the business risk for each of the portfolio business entities with respect to the service relationship with each of the other business entities. The displayed information includes indicators of risk with respect to one or more of the other business entities. The indicators of risk include at least one of: a security rating, and a BitSight® Security Rating. The displayed information includes information from which an entity associated with the portfolio can balance risk across the business entities that belong to the portfolio. The entity associated with the portfolio includes an insurer. The displayed information includes information that is indicative of a business risk to one of the other entities based on service relationships of additional entities with the other entities. The service relationship includes at least one of website hosting and email management. The business entities that belong to the portfolio are identified by a user.

In general, in an aspect, activity is automatically observed that is indicative of service relationships between business entities that belong to a portfolio and other entities that provide services. The service relationships are identified. A user is provided, through a web browser or a mobile app, information about the service relationships between the portfolio business entities and the other entities that provide the services. The information is indicative of risks to an entity that is associated with the portfolio of doing business with the portfolio business entities.

Implementations may include one or any combination of two or more of the following features. The activity is observed automatically from sources external to the entities. The activity is observed from two or more sources. The activity is observed from publicly available documents. The publicly available documents comprise public filings, press releases, disclosures, or resumes. The risks are associated with at least two of the portfolio business entities having service relationships with a particular one of the service providing entities. The activity includes transactions between a client and server that use at least one protocol associated with a TCP/IP stack. The activity is observed at the server. The activity relates to TCP or UDP ports or services with respect to a particular IP address. The activity relates to requests for records maintained by elements of the DNS. The activity relates to data or transactions of database application protocols. The activity relates to assets of application protocols. The activity relates to security handshakes. The transactions include information that conforms to a format of the protocol or information that does not conform to a format of the protocol or both. At least some of the activity is observed actively. In some instances, the observation is solely active. At least some of the information is observed passively. In some instances, the observation is solely passive. The information may be observed by a combination of active observation and passive observation. The activity to be observed is caused for the purpose of observation and not for the intended purpose for which such an activity normally occurs. The activity is caused so that the observation of the activity provides information that corresponds to the activity and other information. Causing the activity includes controlling an IP address of the source of the activity. Causing the activity includes controlling a timing of the activity. Causing the activity includes controlling characteristics of a request that causes the activity. At least some of the activity is observed passively. The activity is observed by a party that has access to the activity along the route of traffic triggered by the activity, by permission. The activity is observed without knowledge of an identity of the client that is a party to the activity. The identity may be known in some cases. The passive observation of the activity includes deriving metadata about the activity. At least some of the activity is observed passively and at least some of the activity is observed actively, and at least aspects of the act of observation are based on information obtained by the passive observation. A classifier is applied to the observed activity to derive information about an entity associated with an IP address or about a service at a port. The derived information includes the identities of entities responsible for an asset. The derived information includes the identity of an entity primarily responsible for an asset. The derived information defines an asset. The asset is defined based on dependencies. The observed activity includes the use of domains and IP addresses and the observed activity is indicative of entities responsible for the domains and IP addresses. The responsibility includes dual entity responsibility. The responsibility includes multiple entity responsibility. The activity on the Internet is automatically observed by collecting raw data at a data collector, and the method includes classifying the raw data at the data collector, and identifying the service relationships based on results of the classifying. The classifying depends on a protocol used for the activity on the Internet.

In general, in an aspect, information is received through a communication network that identifies a portfolio of business entities with which a principal entity has or is considering business relationships. Based on the information the portfolio business entities are identified. A database is queried to identify third-party entities that provide technology services to the portfolio business entities and to identify a category of technology services to which each of the technology services provided to the portfolio business entities belongs. Based on the identified third-party entities and the categories of technology service, risks to the principal entity are determined that are associated with the providing of the technology services by the third-party entities to the portfolio business entities.

Implementations may include one or any combination of two or more of the following features. The determined risks are reported through the communication network for use in displaying the potential risks to a user. The determined risk is based on the providing of a category of the technology services by a particular one of the third-party entities to more than one of the portfolio business entities. The determined risks are indicative of possible steps that could balance the risks across the portfolio business entities and reduce the risks to the principal business entity. The principal business entity includes a carrier of insurance risk.

In general, in an aspect, information is obtained about Internet-related assets of organizations, by computer. The information is used to identify relationships between the organizations with respect to the assets. The information about the identified relationships is made available for display or analysis or both.

Implementations may include one or any combination of two or more of the following features. The obtained information was automatically derived from sources external to the entities. The obtained information was derived from two or more sources. The received information was derived from publicly available documents. The publicly available documents comprise public filings, disclosures, or resumes. The Internet-related assets include assets that are associated with Internet registries. The Internet-related assets include domain names and Internet Protocol addresses. Each of the Internet-related assets is associated with an owner by the Internet registries. The obtaining of information about the Internet-related assets of organizations includes determining the relationship of the responsibilities for the assets as indicated by domain name registries and from Internet Protocol address registries. The responsibilities include hosting of websites having particular domain names and processing Internet protocol communications directed to particular Internet Protocol addresses.

These and other aspects, features, implementations, and advantages can be expressed as apparatuses, methods, systems, components, software, methods of doing business, and in other ways.

These and other aspects, features, implementations, and advantages will become apparent from the following description and from the claims.

DESCRIPTION

Figure 9:
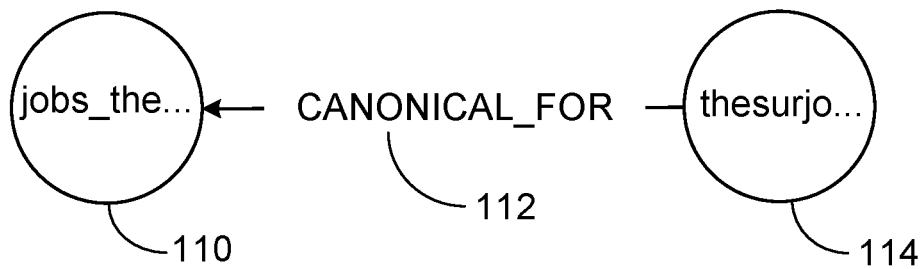
Figure 10:
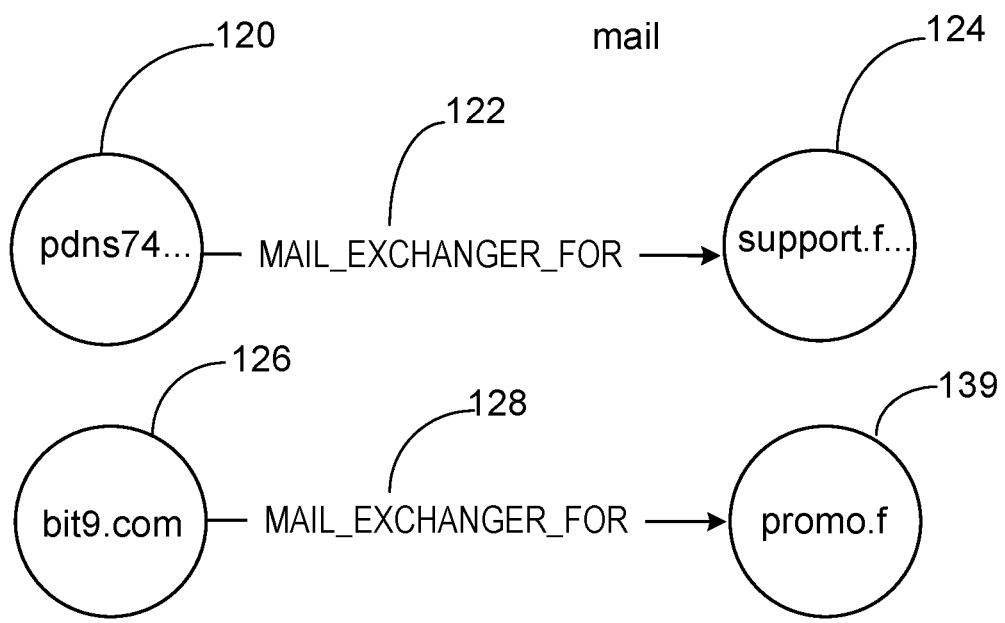
Figure 11:
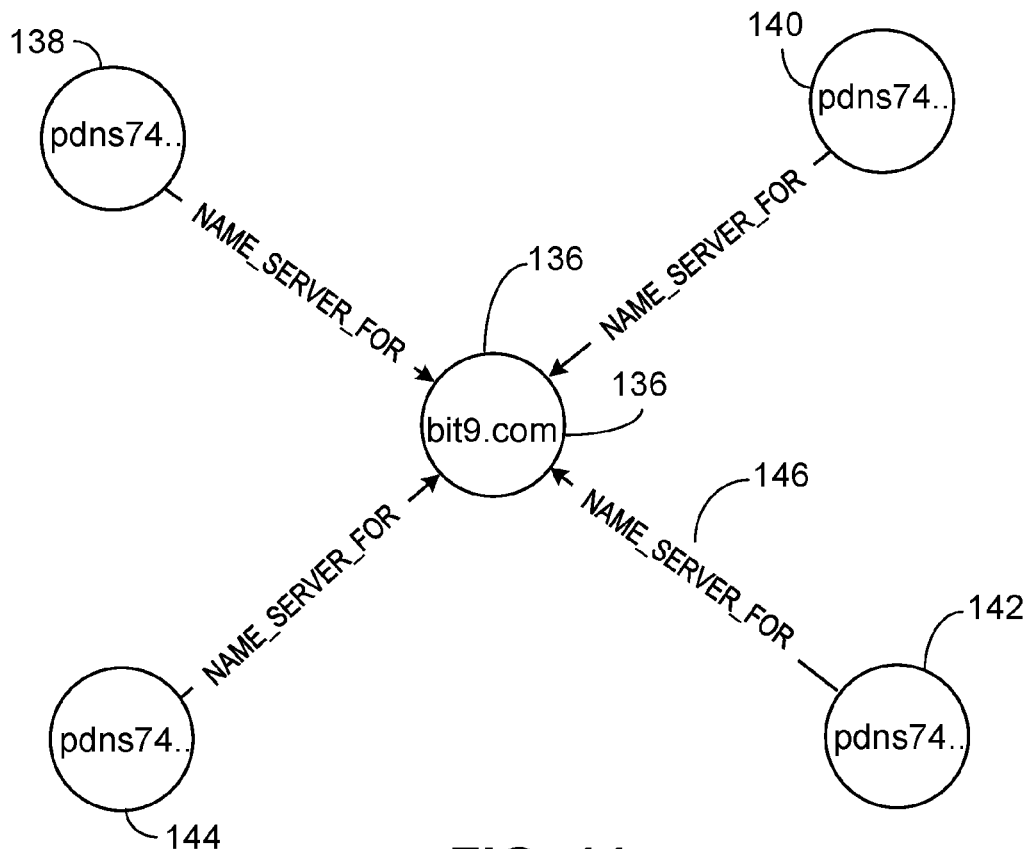

FIGS. 9, 10, and 11 are flow diagrams.

Figure 12:
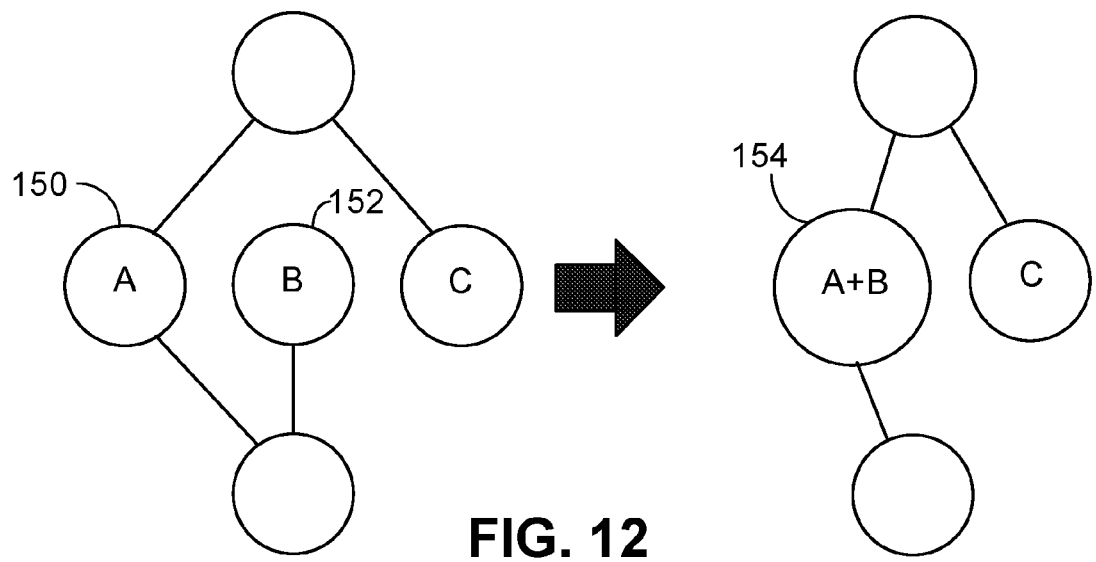
Figure 13:
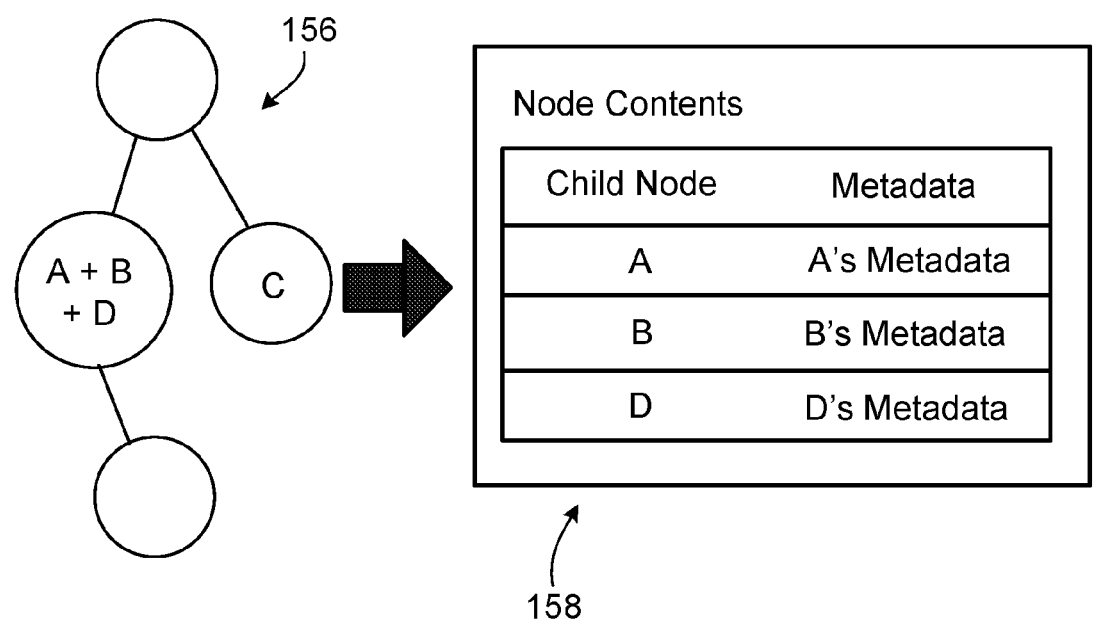

FIGS. 12 and 13 illustrate parent-child relationships.

Figure 14:
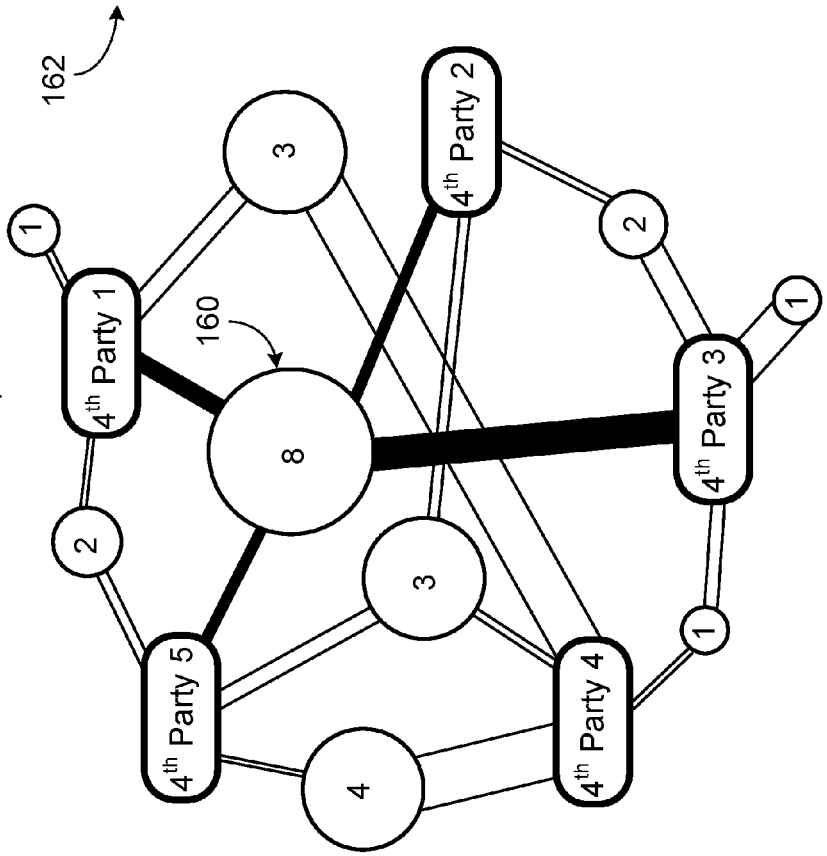
Figure 15:
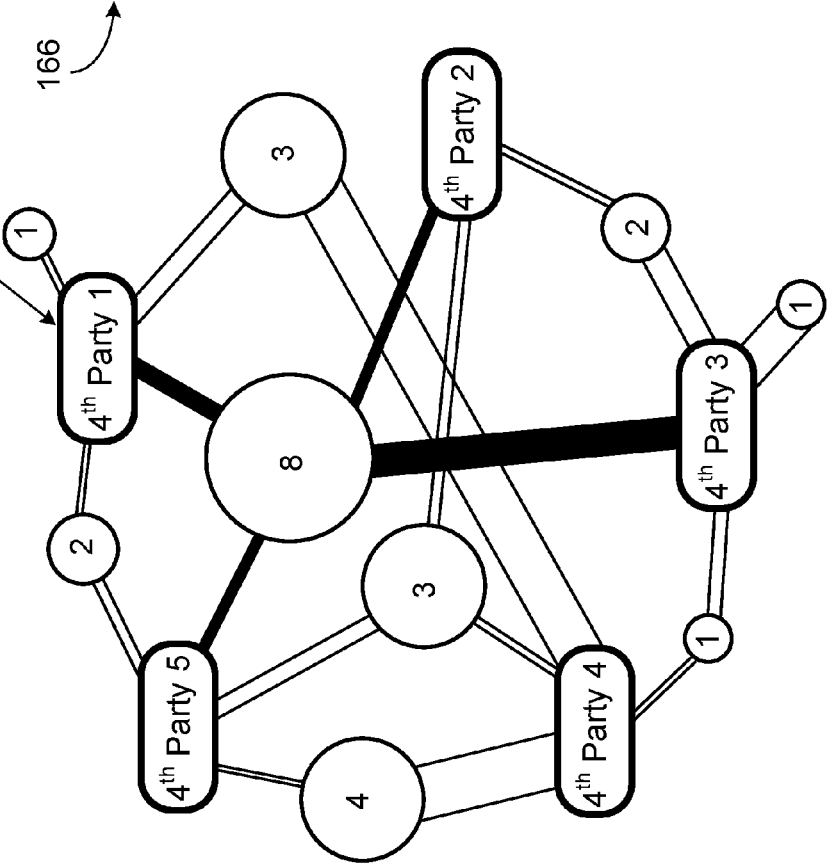

FIGS. 14 and 15 are partial views of business graphs.

Figure 16:
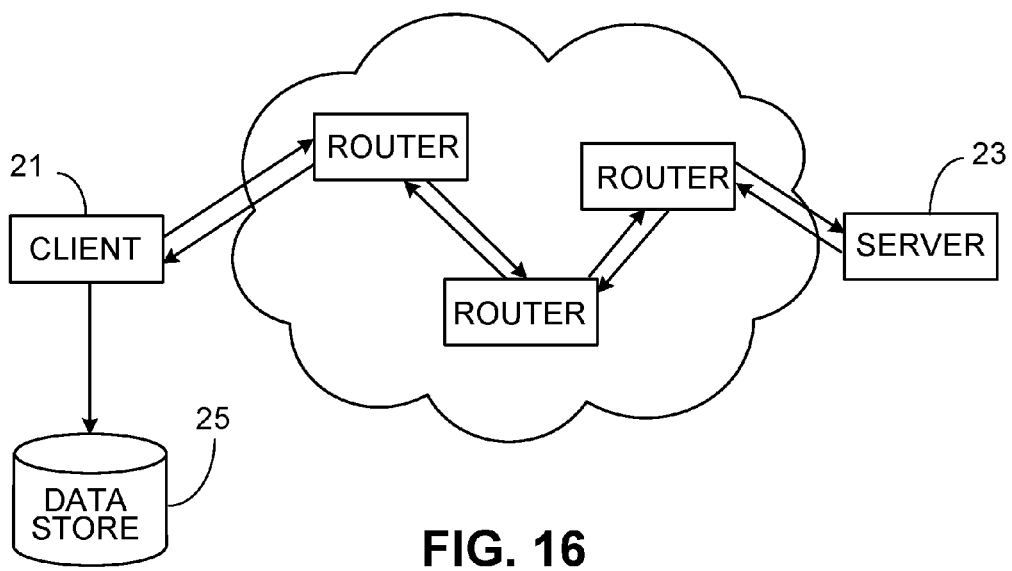

FIG. 16 is a diagram describing active collection in which the client is under the control of a collecting entity and is also the entity storing the results or feeding it back to another entity that stores the results.

Figure 17:
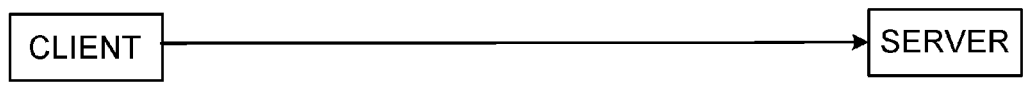

FIG. 17 illustrates an example of a client HTTP request to a server.

Figure 18:
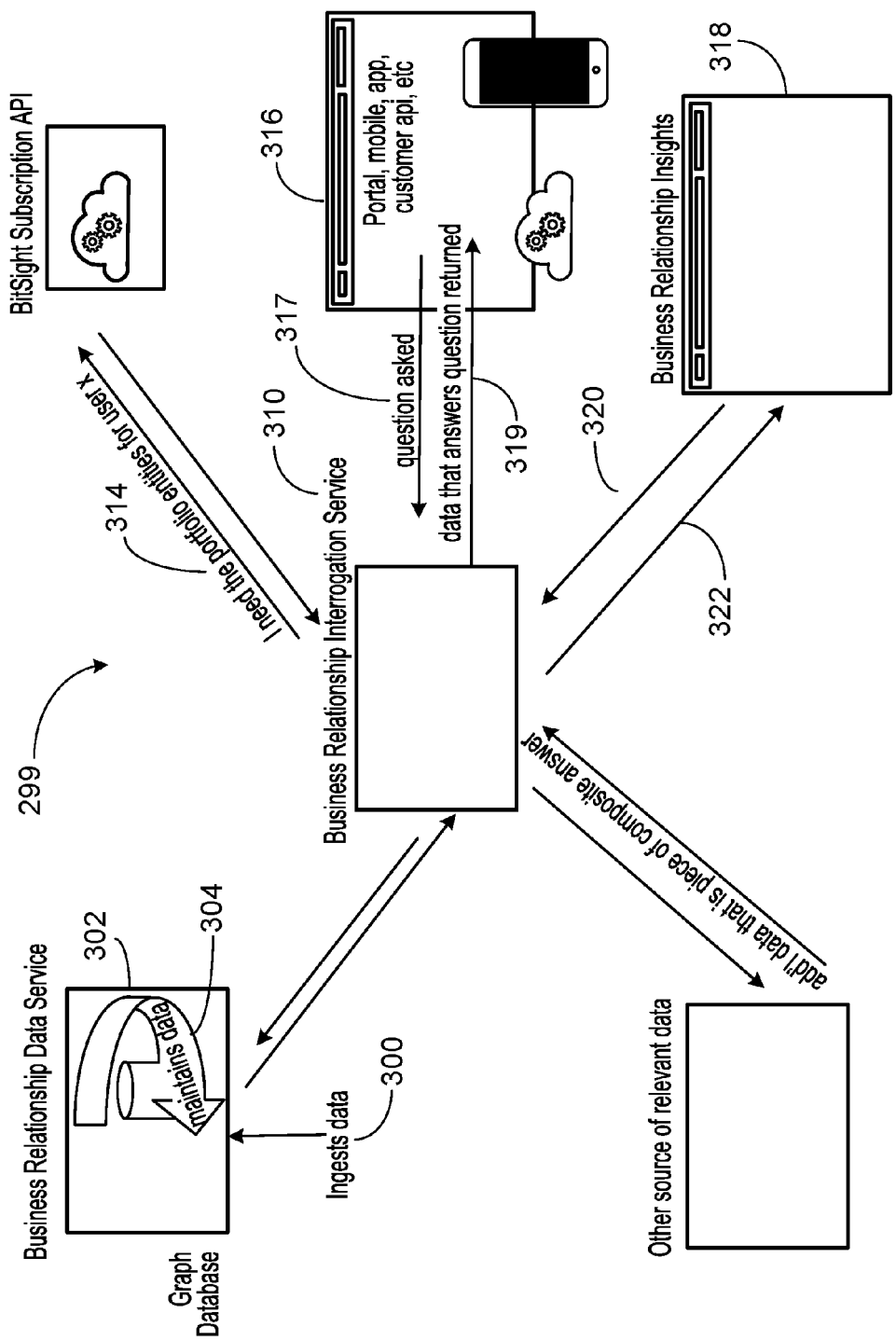

FIG. 18 illustrates matching patterns to show interesting business relationship information.

FIGS. 19 through 26 are mock ups of screen shots.

Here we describe a system and techniques for determining, analyzing, reporting, acting on, and engaging in other activities with respect to relationships among technology assets (including services) and the entities responsible for them.

Entities—for example, a corporation—and other parties interested in the entities sometimes find it useful to track the complex and multi-tiered relationships that exist among those entities and other entities and to generate graphical representations of the relationships, for example, graphs or maps.

We use the term "entity" broadly to include, for example, any group, institution, organization, company, partnership, individual, family, government, or other unit or body that has relationships with one or more other such entities, including entities that are recognized as official entities of their respective types.

We use the term "relationship" broadly to include, for example, any affiliation, alliance, association, connection, link, or tie between or among two or more entities, such as between a vendor and a purchaser; or a client and a server; or a parent and a child (such as a subsidiary) in which the parent is comprised of one or more children; or an insurance carrier and an insured, to name a few.

We use the term "service relationship" broadly to include, for example, any relationship that involves the providing of a service by one entity to one or more other entities. Examples of service relationships include one entity (such as Amazon Web Services (AWS) hosting websites or other services for other entities; and one entity (e.g., Paypal) providing payment processing services to other entities (such as stores and companies).

We use the term third-party relationships broadly to include, for example, direct relationships between a given entity and another entity, such as a service relationship in which the other entity provides a service to the given entity.

We use the term fourth-party relationships broadly to include, for example, relationships between entities that are indirect or not directly "visible." An example of a fourth-party relationship is the relationship that a company using Amazon Web Services would have to Cisco Systems, Inc., which provides services to Amazon and therefore provides services implicitly or indirectly to or for the benefit of the company. Fourth-party relationships can include relationships with multiple levels of indirection between an entity and its fourth-party entities.

We use the phrase fourth-party ecosystem broadly to include, for example, a given entity's fourth-party relationships that exist through all of the third-party relationships that the given entity has with other entities. Information about relationships may include not only the existence of the relationship but also the direction of the relationship, for example, not only that entity A has a service relationship with entity B, but also that the relationship is in the direction in which B provides the service to A.

We use the term "graphical representation" broadly to include, for example, one or more graphical elements that represent information; the graphical elements can be any visual elements such as points, lines, shapes, regions or any other geometric constructs, icons, symbols, controls, windows, or lists; in some cases the graphical representation can comprise a graph, a map, a block diagram, a flow diagram, chart, or a matrix, to name a few.

We use the term technology assets or sometimes simple assets broadly to include, for example, anything that has a technology component and is of value to an entity; technology assets and services can include hard assets, soft assets, services, reputation, goodwill, and a wide variety of others. In particular examples an asset is a particular IP address or a particular domain.

Information about relationships among technology assets and services and the entities responsible for them can be collected, stored, and analyzed in a wide variety of ways as a basis for understanding the relationships, the assets, the services, and the entities, and for creating graphical representations of them, such as graphs or maps.

In some cases a graphical representation can take the form of an entity map (which we sometimes also call a business graph). We use the phrase "entity map" or "business graph" broadly to include, for example, any graphical representation of relationships among entities or assets or both. An entity map can provide a visualization of entities, relationships, and assets using a graphical user interface and a graph database that stores nodes and edges. A business graph can illustrate all of the third-party and fourth-party relationships of a populations of entities.

In some cases, nodes are associated with entities or assets or a combination of them, and edges are associated with relationships among the entities or assets and the information about nodes and edges is stored in a graph database. The information stored in a graph database corresponds to a mathematical construct that is sometimes called a node graph in which nodes represent entities (called child nodes) or accumulations of entities (called parent nodes), and edges represent relationships (and in appropriate cases directions of relationships) among entities.

A database engine associated with a graph database can manage, update, query, and perform other operations with respect to the graph database and nodes and edges stored within the graph database. The database engine also can respond to controls displayed on the graphical user interface and invoked by the user. In that way, the user can partially or completely control the information represented by elements of the map and visual characteristics of the display of the map and its elements to the user through the graphical user interface.

For example, a user can use displayed controls of a graphical user interface, to formulate, update, alter, or apply a database query to the graph database. In some cases, the displayed controls can include elements that can be invoked by the user in such a way that the user need not formulate or edit a formal database query in the usual way. The graph database can respond to the controls invoked by the user and display graphically nodes and edges that are a result of applying the query to the graph.

An entity can be characterized by its relationships with other entities. For example, an entity can be called a third-party entity with respect to a first entity if it has a direct relationship, known as a third-party relationship, with the first entity. For example, if a first entity such as corporation uses services provided by a social networking website, the social networking website can be called a third-party entity relative to the first entity, and the relationship between the first entity and the third-party entity can be called a third-party relationship. In addition, an entity that provides a service to a third-party entity, for example, Internet service provided to the social networking website, can be called a fourth-party entity relative to the first entity, and the relationship between the fourth-party entity and the first entity can be called a fourth-party relationship.

A relationship can be characterized by the entities that are parties to the relationship. In some cases, a relationship can be a parent-child relationship such that one entity (the parent) contains or owns one or more other entities (the child or children). In some examples, the relationship is a service relationship such that one entity provides a service directly to another entity which is being served.

A particular entity can have service relationships in which it provides a given service to one or more other entities, such as a payment processor (e.g. PayPal) providing checkout processes to stores and retail establishments.

A fourth party relationship is an indirect relationship between two entities in which a third-party entity is between them. An entity's assortment or portfolio of fourth-party relationships, which occur though its third-party relationships, can be called a fourth-party ecosystem of the first entity.

For example, a web hosting service has a third-party relationship with the owner of a website that it hosts. In such a context, an advertiser advertising on the third-party entity's website has a fourth-party relationship with the web hosting service. In some examples, there can be many entities, such as advertisers, that each have a fourth-party relationship with the web hosting service. In addition, an advertiser may have fourth party-relationships with several web hosting services by advertising on a websites that are hosted by those services. The advertiser also can have fourth-party relationships through other entities with which it has a third party relationship, such as the email service provider for the websites on which the advertiser advertises. The portfolio of fourth-party relationships for the advertiser is the fourth-party ecosystem of the advertiser.

Information about the third-party and fourth-party relationships of an entity can be useful in a variety of ways. A first entity may wish to know the third-party relationships of a second entity.

For example, an insurance company may want to know which cyber security company has a service relationship with a retailer to protect data of the retailer's customers.

In some cases, for a given set of entities, it can be useful to know what proportion of the set of entities has a relationship to a particular entity. For example, an insurance company may want to know what percentage of retailers that it insures have contracted with a particular cyber security company for protecting customer data.

Based on the determined relationships, the assets of an entity that are affected by the relationships can be determined. We sometimes use the word asset to refer broadly to, for example, any service or hardware or other item that is used to conduct an instance of a relationship between entities. For example, an asset could be a server controlled by one entity and that has a particular IP address, domain, or subdomain. There are many types of assets that may be used in conducting relationships between entities. The types of assets may include, for example, SSL certificates, websites, firewalls, VPN head ends, web cameras, mobile device management servers, mail servers, and a wide variety of other devices and services.

In general, each asset is under the responsibility of a given entity and each entity is responsible for one or more assets. The nature of the responsibility and be, for example, that an entity owns, controls, maintains, or supports an asset.

We also say that assets have dependencies. A dependency defines, for example, a relationship between the responsible entity and another entity with respect to an asset. For example, a dependency relationship exists between an entity that is a client and an asset for which an entity that provides the service is responsible. Said another way, the client entity is dependent on the asset of the service providing entity.

To determine which relationships exist among entities, data that describes or implies the relationships among entities is collected. The data can be collected from one or more sources. We use the term source broadly to include, for example, any place from which data is provided or from which data can be generated based on activity of an entity, among other things.

In some examples, the data are collected by observing and interpreting transactions that occur on the Internet. We use the term transaction broadly to include, for example, any interaction between two parties that can be entities, assets, services, devices, or other parties capable of engaging in an interaction.

In some cases, a transaction involves a client, which initiates a session, requests a resource, submits data, or engages in some other activity that causes the initiation of the transaction. The transaction also then can involve a server, which responds to, for example, a request by a client to establish a session, fetch data, store data, or perform another operation. In such cases, each of the servers and clients can be associated with one or both of a hostname and an IP address. In some examples, multiple servers, clients, or both can be involved in a transaction. For example, multiple servers are used to complete a transaction request by a client using DNS, HTTP, or similar protocols. In some examples, the data collected for the transactions that use the protocols can be the data provided by a server.

A wide variety of data can be collected or generated, including, for example, data of the transaction itself and metadata of the transaction that can include metrics of the transaction. Transaction data can be in a format defined by the protocol being used. Transaction metadata can be in a format of the protocol being used or another format. Transaction data can include data being sent from a server to a client. For example, metadata can include server identification, target server identification (e.g., using DNS and WHOIS data), and server classification data (e.g., using HTTP, XMPP, SMTP, and similar protocols). The data can be collected using one or more layer protocols in the common TCP/IP stack.

In some examples, data indicative of relationships are collected using so-called active collection. Active collection applies, for example, when the client conducting a transaction is controlled by the party collecting the data. In active collection, the party collecting the data may intentionally control or modify actions that the client performs and in that way be able to collect more data, more accurate data, more useful data, and data that achieves other purposes. The response from the server can vary based on factors such as the request sent by the client, the timing of the client request, the number of requests sent by the client, or any combination of such factors.

In some examples, data are collected using passive data collection. Passive collection is used, for example, for a source that is not susceptible to being controlled by the collector. Typically in passive collection, the data collector is a third party to the transaction from which data are being collected. In some examples, the third party collector has access to traffic that includes transactions by agreement of an entity through which the traffic passes.

In some examples, passive data collection can be used to collect a wide variety of metadata about transactions of a server. For example, collected metadata can include one or more of the following: a number of unique clients conducting a transaction with a server; a number of unique characteristics of clients who conducted a transaction with the server (and the preferences of client types); a duration of the client transaction with the server; a unique set of actions performed by the client; a number of clients that conduct repeat transactions with the server; the frequency of various requests or transactions by one or more clients; the most frequent response by the server; and other similar metadata.

Passive data collection and active data collection can be used together to enhance the performances of each collection approach. For example, passive data collection can reveal additional server response types or resources on the server that were inaccessible by the controlled client during active data collection.

Collected data can be subjected to a wide variety of processing to derive useful information about entities, assets, and their relationships, among other things. One type of processing can be translation of the collected data by a translation layer, which in some cases can also be called a classifier. The classifier can determine the identity of an entity that is responsible for the asset engaging in a transaction. For this purpose, data from Internet registries and from entity maps can be used to associate an asset with an entity that is responsible for the asset. The data from registries and entity maps can be used to determine additional dependencies of the responsible entity. The classifier can determine a type of the asset. Relationships among entities can be identified using the determined dependencies.

Translated data from the classifier can be used in a wide variety of ways, including to populate a graph database containing nodes and edges. The information in the graph database can be used, in turn, for a wide variety of purposes.

For example, a graph or map (which we sometimes call an "entity relationship map" or a "business graph") illustrating third-party and fourth-party relationships among entities can be generated from the graph database. The entity relationship map can be displayed on a graphical user interface. The existence and direction of dependencies determined during the translation of the collected data, can be displayed as part of the map. For example, the dependencies can be used to determine which entity in a relationship is a service provider. Nodes can be used to represent entities and accumulations of entities on the map. For example, child nodes can represent child entities and parent nodes can represent parent entities that comprise accumulations of child entities. Edges can be used to represent relationships and the directions of dependences (e.g. which entity is dependent in a relationship).

When a business graph is displayed to a user through a graphical user interface, the user can be provided with controls to enable a wide variety of actions with respect to the business graph. For example, the portion of the entity relationship map that is displayed can be determined by controls displayed to the user, such as filter controls. The user can manipulate the displayed filter controls to alter a database query easily and intuitively without having to formulate or edit the database query in the typical (sometimes cumbersome and formalistic) way. A user can filter the displayed nodes and edges based on one or more characteristics of the nodes or edges in the business graph. For example, multiple child nodes can be condensed into a single parent node based on the relationships of the entities represented by the multiple child nodes with other entities. For example, entities having common third party relationships can be condensed into a parent node. Entities having fourth-party relationships with a given entity can be kept and displayed as distinct nodes.

For some nodes that are the result of applying a database query, the entity relationship map can display information about the nodes as text instead of graphically. For example, the contents and related metadata of a selected parent node can be displayed in a table when the parent node is selected by the user. The table can include text associated with one or more nodes. For example, the table can include text related to entities associated with child nodes.

The display of nodes and edges that are the result of an applied query can change dynamically as the user invokes the displayed controls. For example, selecting a node representing a fourth-party entity can cause the display to show a table of all impacted third-party entities, regardless of their connections to other fourth-party entities. In some cases, selecting an edge representing a relationship can cause the display of metadata related to the relationship.

In some implementations at least the following types of nodes [and respective attributes of those nodes] may exist in the graph database: entity [name, industry, rating (e.g., BitSight rating), type 4 GUID as a universal identifier, employee count, logo, locations, primary domain/url, description, stock symbol], domain (same as a subdomain) [registration start and end dates, which domain registrar provides it, whois information with the contact name, company, address, phone number, and emails for the registrant, designated name servers], SSL certificate [subject name, serial number, valid after and before dates, signing algorithm, key algorithm, key length, the actual certificate, SSL certificate Issuer], information that can be obtained by crawling and visiting websites or from organizations that crawl websites, technology [a technology being used, name, description, link—note that technology providers can be mapped to entities stored in the graph database (e.g., BitSight entities) such that the providers will have the same attributes as other such entities] and category (categories of technology being used), among others.

In some implementations, at least the following types of edges may exist in the graph database: SUBDOMAIN_OF (one domain as a subdomain of another), OPERATED_BY (domain operated by an entity), MATCHES (SSL certificate common name(s) matches domain or subdomain), SERVED_BY (SSL certificate served by a server attributed to an entity), ISSUED (SSL certificate Issuer issued an SSL certificate), SIGNED_BY (SSL certificate signed by another SSL certificate), CATEGORIZED_AS (categorization of a technology), NAME_SERVER_FOR (domain/subdomain acting as a name server for another domain/subdomain— models NS DNS records), MAIL_EXCHANGER_FOR (domain/subdomain acting as an authorized email recipient for another domain/subdomain—models MX DNS records), CANONICAL_FOR (domain/subdomain acts as an alias for another domain/subdomain—models CNAME DNS records), and the following technology edge types: CMS, SERVER, WEB_SERVER, JAVASCRIPT, FRAMEWORK, ANALYTICS, NS, CDN, MEDIA, FEEDS, HOSTING, WIDGETS, ADS, SSL, DOCINFO, SEO_TITLE, CSS, SEO_META, MOBILE, MX, ENCODING, SHOP, PAYMENT, MAPPING, SEO_HEADERS, WEB_MASTER, CDNS, SHIPPING, LINK, and PARKED, among others.

Additional Description

As suggested above, the systems and techniques that we describe here can observe and interpret data from transactions that occur on the Internet with respect to layer protocols in the common TCP/IP stack. Each transaction can involve a client (often initiating a session, or requesting a resource, submitting data, etc.) and server (for example, accepting or rejecting session establishment, fetching data, storing data, updating existing data, ending a session) and server (accepting or rejecting session establishment, fetching data, storing data, returning data, making local updates, terminating sessions). Some protocols may require a client to have transactions with multiple servers to complete the client's original transaction (e.g., DNS, HTTP). The data collected with respect to these protocols and those used by the system are always the information provided by the server that is the endpoint of the transaction.

Each of the server and the client can be represented as either a hostname (e.g., www.example.com) or as an IP address (192.0.2.14) throughout our description. Often a server will have both a hostname and an IP address associated with it. The server will always have an IP address, but it may not have a hostname. Also, the responsibilities respectively for the hostname and the IP address may belong to two different entities, as will be discussed later.

The application protocols for which data can be retrieved, and the data that can be retrieved, includes:

1. A unique set of open, filtered, and closed TCP and UDP ports and services on an individual IP address.
2. DNS, including responses for resources of the record types A, AAAA, TXT, PTR, MX, CNAME, NS, SRV, SPF in the Internet namespace and VERSION in the CHAOS namespace of a given host.
3. Data and transactions of other standardized application protocols of a host, including but not limited to: Telnet, SSH, HTTP and HTTP/2, SPDY, SMTP, POP3, IMAP, FTP and SFTP, NTP and NNTP, rlogin and rsh, Kerberos Network Authentication Service, SNMP, BGP and BGMP, Netbios, LDAP, ISAKMP, RIP, XMPP and MSNP, PPTP, L2TP, SIP, RFB, IRC, WHOIS, rWHOIS, RTSP, SSDP and MSDP, MDNS, Time, TACACS+, DHCP and BOOTP, Finger, ONC RPC, NetBIOS, SNMP and SGMP, VNC and XDMCP, SNPP, SOCKS, CVS, SVN, UPnP, BitTorrent, and Tor and I2P.
4. Data and transactions of non-standardized database application protocols, including but not limited to: MySQL, Postgres, Redis, MongoDB, CouchDB, memcached, hbase, Oracle, Neo4j, etc. Specific data includes but is not limited to database size, names, table names, data content types, and other heuristics.
5. Data and transactions of non-standardized other application protocols, including but not limited to: zookeeper, Citrix services, Ventrilo, mumble, X11, pcAnywhere, etc. Specific assets of the protocols include but not limited to banners, host information, versioning, connected peers, etc.
6. TLS handshakes, which wrap a number of the application level protocols; examples include but are not limited to HTTP, SMTP, IMAP, POP, and FTP (as respectively HTTPS, SMTPS, IMAPS, POP3S, and FTPS). Specific data points includes the Server Hello responses, Certificate payload, and cipher selection methodology of the endpoint including its key exchange cryptographic public value and generators.

We use the term "data" in the above list to represent both the actual response expressed in the format defined by the protocol and metadata of those transactions that may not be in the format of that protocol, but may comprise metrics of the transactions. In some cases, the information revealed by a server in a transaction only describes a different server or set of servers which the system is interested in, and not the actual server the client might be communicating with (e.g., in the case of WHOIS and DNS), or the response by the server is used to classify itself (such in the case of HTTP, XMPP, SMTP, etc.).

Any transaction on these protocols can be collected passively or actively. Also, for any protocol the collection can happen both actively and passively, providing a feed of actively collected data and a feed of passively collected data. The part of the system that interprets the transactions may treat records within these feeds as the same and ignore the fact that one was collected actively or collected passively.

Active Collection

If the transactions of the protocols from which information is to be collected are conducted actively, it means, for example, that the client conducting the transaction is controlled by a party who is conducting the transaction for the purpose of collecting the information rather than for a normal business purpose of some other party. The system that we are describing here can be the party in control of conducting the transaction.

In that context, the party conducting the transaction can modify the actions and series of actions that the client performs. For example, in the case of HTTP, the client might send the server a "GET" request and include a "Host" header specifying a domain. In another transaction to the same host, the client may send the server a different "GET" request to a different resource, including a different domain in the "Host" header, and an "Authentication" header. The response back from the server may be different based on what the client includes in its request, and also may vary depending on the number of requests performed within a specified time period.

Actively collected data is inherently more controlled because the party conducting the collection can choose the source of the client (by its source IP address), the timing of the requests, and the characteristics of the request, whose possibilities vary by the protocol being used. For example, in the case of HTTP, the client can be caused to mimic a Chrome web browser on a MacBook Pro running OS X 10.10.1, and at another time the same client can be caused to act like an Internet Explorer version 6.0 web browser on Windows XP SP1. The response of the server to the two different client behaviors may be different to ensure compatibility with older technologies. Changing the timing of individual requests can put more control around the change in client behavior.

As shown in FIG. 16, for protocols that are stateful, if a collecting entity has control of a client entity 21 in an active collection mode, the collecting entity can proceed through the protocol's inherent state in different ways. For example, when connecting to an XMPP resource (server), it is customary as defined by the RFC for the client to send the first data payload to the server 23 (effectively saying "Hello" and including some information about itself, such as the data format it expects and whom it expects to talk to). The server would then reply back with supported authentication mechanisms, such as ANONYMOUS or PLAIN. The client could then attempt to connect using ANONYMOUS or PLAIN, and each of those would require different information that the client would need to include and would elicit different responses from the server. As such, the client would be proceeding down different decision trees and collecting and storing [element 25 in the FIGURE] different information about the persistent and temporal state of the server not otherwise available in passive collection.

A third example of active collection, much like the previous one, involves a protocol that is interactive between the client and server, and perhaps allows the ability of the client to issue direct commands or queries. While XMPP is interactive at a certain point in the protocol, FTP is a more straightforward example. When a client establishes a TCP session with an FTP server, it has the ability to issue a 'HELP' style command to see the commands that the server supports.

Some of these may include the ability to switch to a more secure connection, while another might give you additional explicit information about the server, or another that allows to switch how the connection is configured. Some of these commands and the server's response might not happen in the majority of client and server connections, and thus the visibility into seeing a server's response in that way is only guaranteed when doing an active collection. Each of the returned support commands, and the output for each of those commands can be used in the context of this system as data points.

Passive Collection

Figure 1:
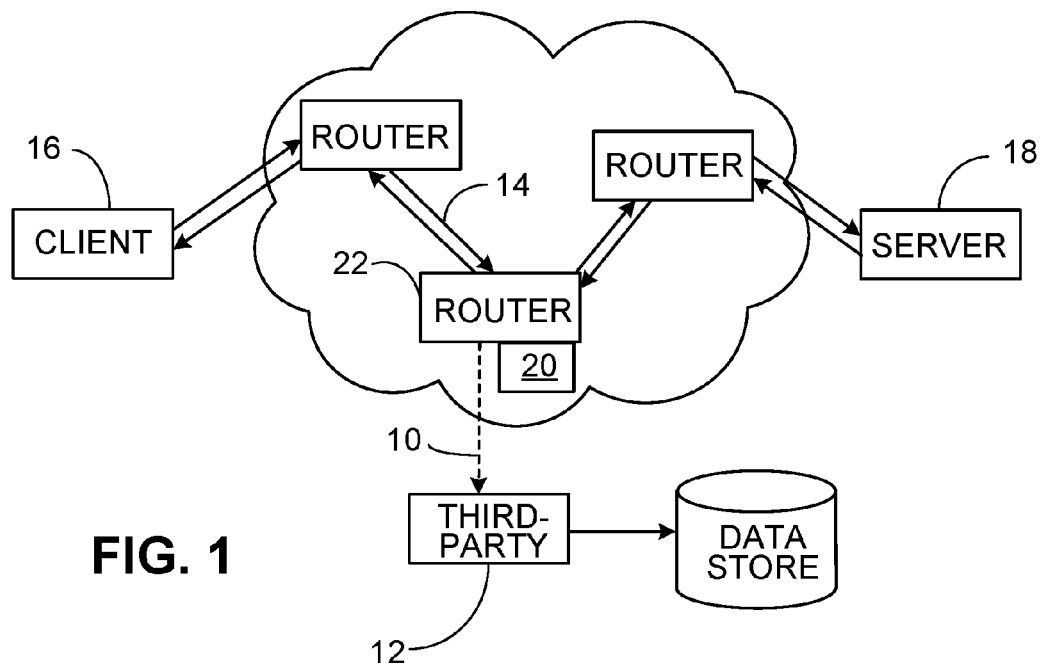
FIG. 1 is a diagram describing a passive collection in which a third-party consumes data from along the route of the traffic.

By passive collection, we mean for example, observing and collecting data about transactions but without altering it. As shown in FIG. 1, if data 10 is collected passively from a protocol transaction, then either:

1. An entity 12 that is a third-party to the normal transaction has access to the data stream 14 that is being used by the client 16 and the server 18 to conduct the transaction (we sometimes call them the endpoints) and is able to observe the traffic representing the transaction between the two endpoints. The collection device of the third party can passively collect all of the data associated with this traffic and can retain the entire set of collected data or may retain only metadata or heuristics about the data streams that are the subject of the collection.

Typically the third-party has access to this traffic by agreement of an entity 20 that lies along the route through which the data stream passes. This is demonstrated in the below graphic as the third-party partnering with the entity that owns the second router 22. In this example, the entity that owns the router might set up a spanning port to allow the third-party to receive all traffic.

Figure 2:
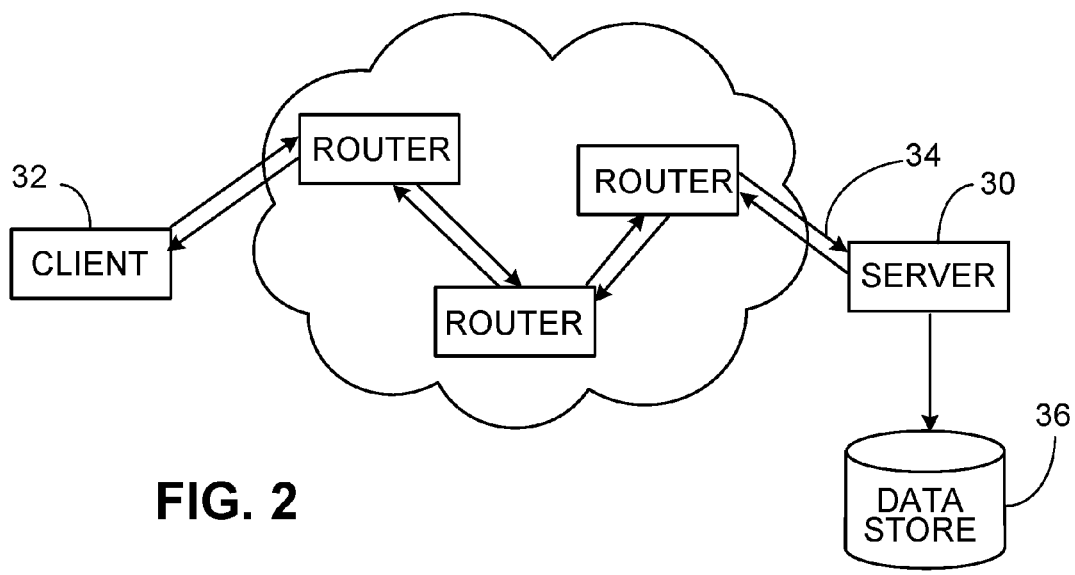
FIG. 2 is a diagram describing a passive collection in which the server stores data from transactions with clients.

2. As shown in FIG. 2, the server 30 with which the client 32 is communicating observes the data stream 34 of the client requests, and its own responses. The server might retain the entire set of data or might retain only metadata or heuristics about its observed transactions. The retained data is stored in a data store 36.

When the collecting is done passively, the transaction of the protocol to the host is conducted by an unspecified client whose source is uncontrolled. In either passive collection methodology, the entity collecting the data will understand the source of the client and its characteristics, and may choose to retain them.

In any case, the exact knowledge, identity, or configuration of the client conducting the transaction is not necessary for the system to know and may be obfuscated in the process of collection and delivery to the system. Obfuscating that information may enable the system that we are describing to have additional opportunities to work with third-parties that may be observing a particular set of traffic because the identity of the client observing the transaction is irrelevant and not necessary for the purposes of this system.

In connection with collecting passively, metadata about the transactions can be computed and collected that would otherwise be nebulous to an active collector depending on the passive collection method, such as:

1. The number of unique clients who conducted a transaction with the server (which we sometimes refer to as "popularity").

2. The unique characteristics of clients who conducted transactions with the server, revealing any preferences of client types. (e.g., "Does this server prefer certain types of clients?")
3. The comprehensive list of client types who contacted this server.
4. The duration of a client transaction with the server.
5. The unique sets of actions performed by the respective clients.
6. The number of clients who conduct repeat transactions with the server in the same session.
7. Clients who revisit the server and their former states.
8. The most frequent request or action provided by clients.
9. Latency of the response per action (e.g., "Are some actions more computationally expensive than others?")
10. The most frequent response provided by the server.
11. The frequency of returned errors from the server.

This and other information that is acquired in the course of passive collection can, in turn, help shape the performance and execution of an active collector, for example in cases where the active collector is unaware of resources or unique responses that exist on the server, or specific responses that would only be revealed in connection with a client request.

At the same time, this can also sufficiently help the translation layer make appropriate decisions regarding the asset. For example, a low-volume web server only observed receiving requests from a small number of clients, or certain specific clients (e.g., "Organization A" users), might imply that this is a resource specific to those users, and whose dataset might be different than other more popular servers.

The metadata from passive collection also can be used as to generate and store the edges between two nodes in the graph database. For example, if a website is detected for which a responsible party is "Organization B" and 70% of the transactions to the server are from clients belonging to an "Organization A" then the system can infer that "Organization A" might have a business dependency (e.g., a type of edge) with "Organization B" in some fashion, which is dependent on the characteristics of the website and information hosted on the website.

Aggregating Data from Multiple Data Sources

Whether the collection source is active or passive, the aggregation of data from the remote data sources to a local database or data repository of the system can be performed in a variety of ways, including:
1. Streaming the data to a collector that may perform de-duplication depending on volume and needs of the original data sets.
2. Fetching the data periodically from a remote source.
3. The collector pushing the data directly into a common data store used by the processing pipeline of the system.
4. Collecting data from legal documents, public disclosures, press releases, resumes, and other publicly available documents.

Translation

The system software includes a translation layer, or classifier, that takes the raw data provided by collectors and answers two important pieces of information about a given host (i.e., a source from either an IP address or domain) and service on a port, and may use more than one data point from the same host or from multiple hosts: Which entities are responsible for this asset (for example, which entities provide maintenance, support, and other activities for the asset)? and What constitutes a particular asset and its dependencies?

The first question primarily determines the attribution of the asset to an entity or to a set of entities depending on the protocol that is being observed. Using information from Internet registries and from known entity maps, the system can determine with which entity an individual host is associated and inherently the entity that has the primary responsibility for the host. This process can also reveal other entities for which the primary entity has dependencies, as discussed in more detail below.

The answer to the second question, describing what an asset is, allows the system to categorize the asset and determine dependencies associated with the asset. The asset can be, for example, an SSL certificate, a website, a firewall, a VPN head-end, a web camera, or a mobile device management server, among others. Some data sources would not need to be classified in such a manner if the protocol in use is self-explanatory in describing the asset.

For example, observing data of transactions of devices using the BGP protocol inherently reveals the service providers, the peers, and the service provider peers of entities. Thus for a given prefix announcement (a transaction in the protocol), no asset identification is necessary because the BGP protocol by nature is static.

On the other hand, in the case of observing data of transactions of devices using the HTTP protocol a richer variety of devices is revealed and they ought to be classified. For example, one server using HTTP could be a retail website using third-party software libraries, while another server using HTTP could reveal a IBM Data Management solution. Each host and device has different dependencies, risks, and considerations.

Processing at the Collector Versus in the Translation Layer

A variety of approaches can be used in attributing assets to entities. For example, the following actions could be performed on each host mentioned in the previous workflows, although the order of the actions is irrelevant and would not change the final attribution of an asset to an entity. In fact, some steps, such as parts of the fingerprinting might be more efficient to perform at the collector which may handle only a subset of the raw data than in the aggregated translation layer through which all data passes. In that case, the translation layer could use the fingerprinting output of the collector as if the translation layer had performed the fingerprinting directly.

Cross-Referencing IP and Domain Assets

An entity's Internet footprint as seen through the eye of the Internet registries comprises the entity's set of allocated, assigned, and re-assigned IP addresses and domains that it has registered. Based on agreed practices that led to the current features of the Internet, the entities to which assets are attributed are accepted to be the authoritative owners of those assets and to have control of them.

Many Internet protocols today use both domains and IP addresses for their operation. By observing the use of these assets by applications that use these protocols, responsibility information can be determined based on whether the assets map back to the same entity as the owner both through domain registries and IP registries.

Figure 3:
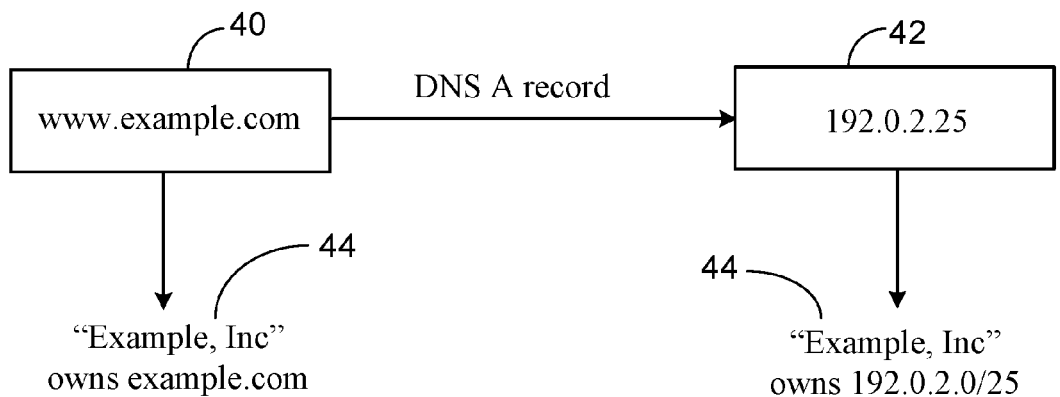
FIG. 3 illustrates an example of a single-organization, zero-dependency asset attribution.

For example, for applications using the HTTP protocol, there is a host having a domain that users interact with, and an underlying IP address where the content is hosted and which a client browser contacts. As shown in FIG. 3, suppose Example, Inc., is an entity 44 that owns the domain example.com 40 and the IP address 198.0.2.0/25 (42 in the FIGURE). If a client starts a transaction with "www.example.com", and the domain is resolved through the DNS protocol to the IP address 192.0.2.25, the client would be accessing assets only owned by Example, Inc.

Figure 4:
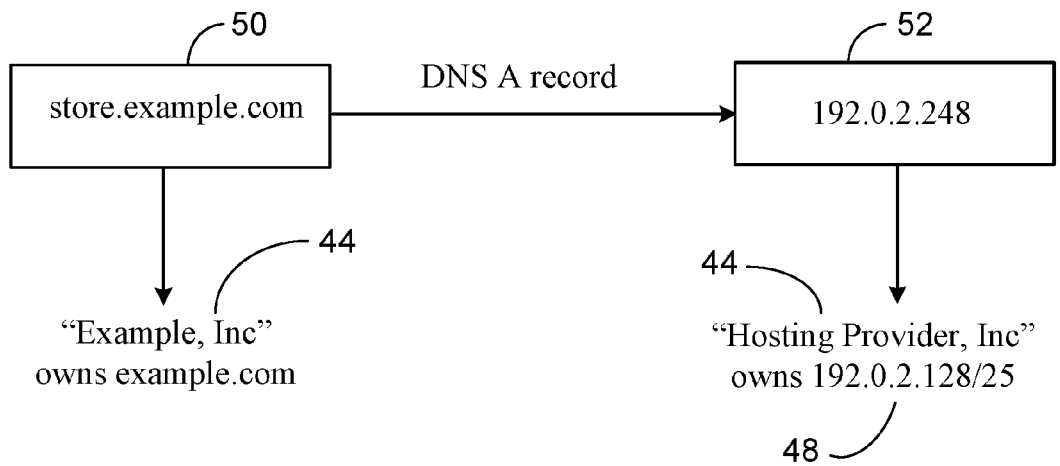
FIG. 4 illustrates a dual-organization, single-dependency asset attribution.

In the example shown in FIG. 4, a "Hosting Provider, Inc" 46 that serves Example, Inc, owns IP address (48 in the FIGURE) 192.0.2.128/25, and Example, Inc, might have a website "store.example.com" 50 that resolves to IP address 192.0.2.248 (52 in the FIGURE), an IP address that is within Hosting Provider, Inc's network. Example, Inc uses Hosting Provider, Inc to host the website, and it's dependent (i.e., Example, Inc has a dependency) on the Hosting Provider, Inc to serve the content. In this example, the website asset would be attributed by the system to "Example, Inc." as the primary asset owner and would generate an edge in the graph database from Example, Inc as a dependency to Hosting Provider, Inc.

Figure 5:
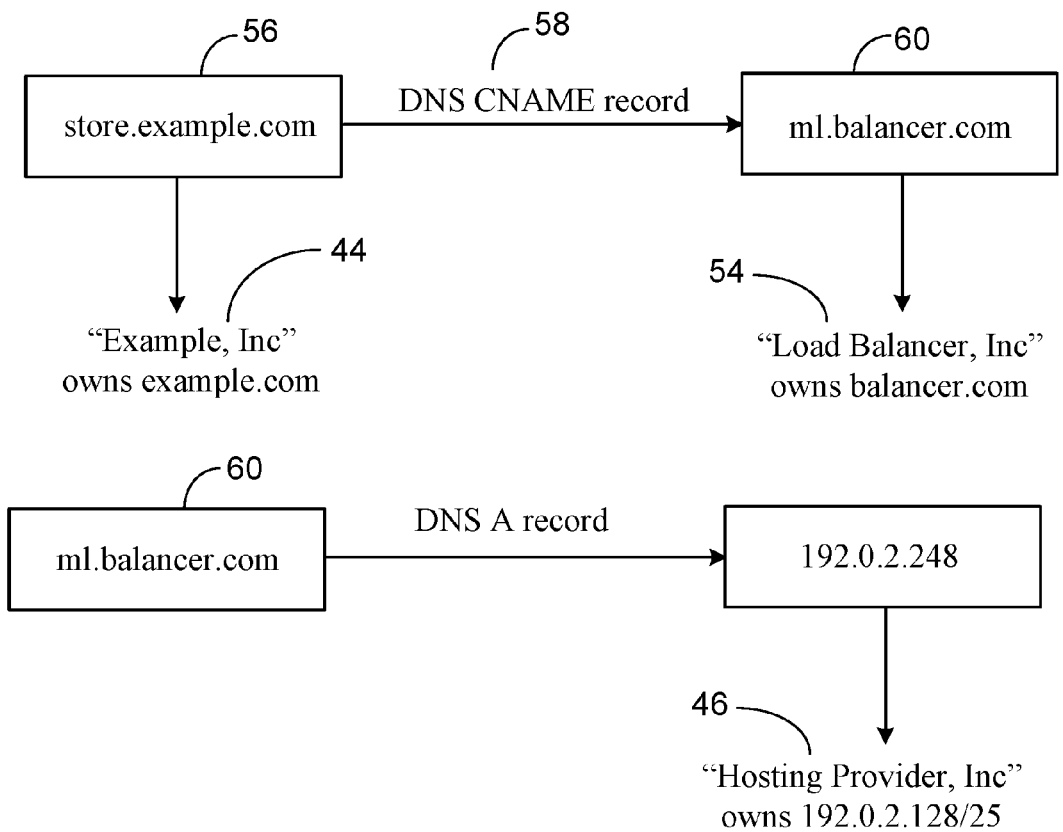
FIG. 5 illustrates a multiple-organization, multiple-dependency asset attribution.

As shown in FIG. 5, load balancing is another service that can be handled by the system. In FIG. 5, a third party "Load Balancer, Inc" 54 provides load-balancing services to customers. In the example, a website is hosted on subdomain store.example.com 56 that resolves 58 to a CNAME 60 (Canonical name, a transaction of the DNS protocol) that shows a relationship to "Load Balancer, Inc", and a subsequent relationship to the hosting provider 46.

In the example, the protocol over which the server (in the last example, the server at IP address 192.0.2.248) is conducting a transaction will determine the classification (attribution) of responsibility. For example if the protocol is HTTP, the Hosting Provider, Inc might be responsible for infrastructure among other assets, but Example, Inc is likely to be the entity responsible for content among other things. The primary attribution of an asset will usually be to the highest level of ownership, e.g., to "Example, Inc" because that entity owns the domain asset, and the other relationships are edges, or dependencies, to Example, Inc's assets.

Fingerprinting Components for Identification

When the raw data from the collector is received by the translation layer, in addition to determining attribution, the translation layer will classify the raw data and determine dependencies, or edges, between entities.

Figure 6:
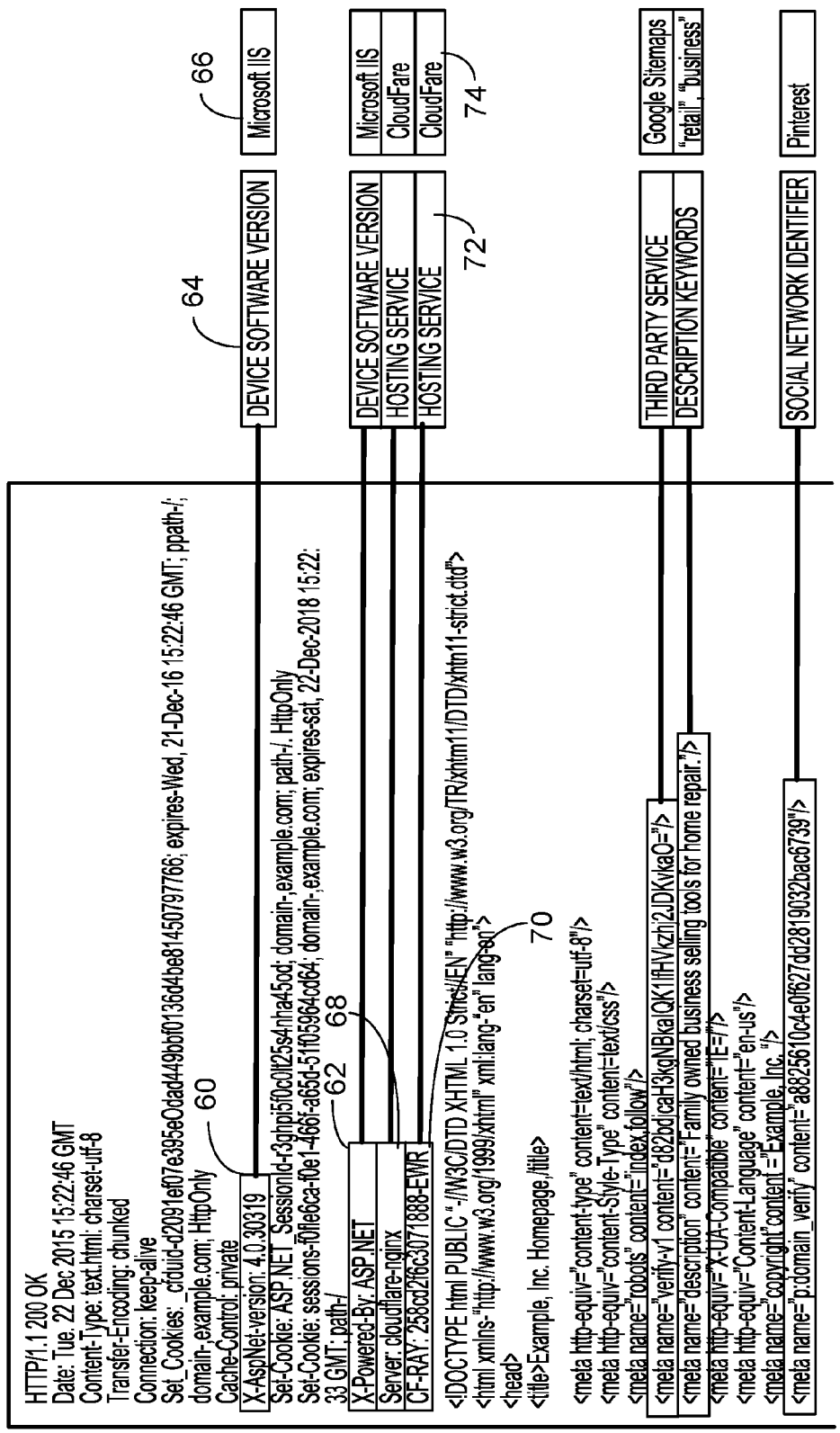
FIG. 6 illustrates fingerprinting an HTTP response to identify assets and relationships.
Figure 6:
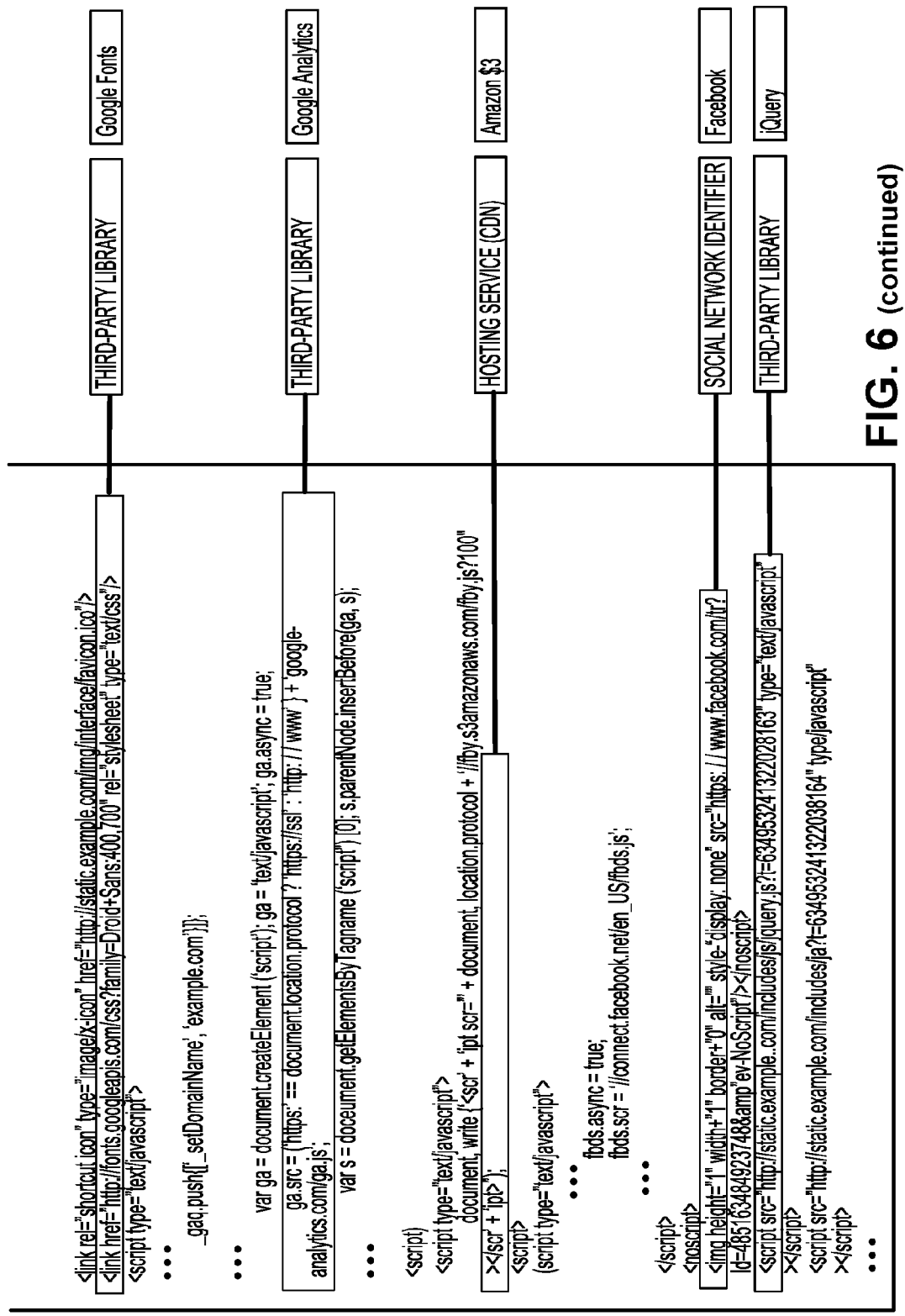

As shown in FIG. 6, the translation layer accomplishes both of these tasks using a rule engine that comprises many rules that may match the content of a single or multiple data response and may match that content a single or multiple times. Classification, and determination of dependencies and edges varies by protocol. Therefore the rules are specific to the protocol rather than applying universally to all data of all protocols.

FIG. 6 illustrates a simple example of a single response using the HTTP protocol from a server to a request initiated by a client, specifically "GET/HTTP/1.1", and how it can be evaluated using what is described above into the respective categories. The example in the FIGURE demonstrates the wide variety of information the rule engine can identify by matching elements of the reply with rules. For example, the HTTP headers, "X-AspNet-Version" 60 and "X-Powered-By: ASP.NET" 62 match a rule 64 that enables the system to determine that the server is using Microsoft IIS software 66. Additional identification within the headers, specifically "Server: cloudflare-nginx" 68 and the presence of the "CF-RAY" header 72 reveals, based on a rule 74 that this website relies upon the Cloudflare service 76 to proxy connections for load-balancing purposes.

Looking further into the content of the response, the presence of "<script src="http://static.example.com/includes/js/jquery.js?t=634953241322028163" type="text/javascript"></script>" demonstrates, by application of an appropriate rule, the use of the jQuery software libraries. This can be further validated by cross-referencing this finding with another transaction of the client and server to confirm that the file requested at this URL to a server is in fact the jQuery software library. Another example is the presence of <img height="1" width="1" border="0" alt=" " style="display: none" src="https://www.facebook.com/tr?id=485163484923748& ev=NoScript"/></noscript> that shows the website interfaces with the Social Network, Facebook, in a possible of various ways, which might include pulling content from Facebook and displaying it on the website or allowing users to "Like" the page from the website, an action that would be shown to the user's followers on Facebook. At the same time, the unique identifier of the website to Facebook is revealed, 485163484923748, which can then be used to determine the connection of multiple websites of the same entity.

As the chart shows, this evaluation can continue throughout the rest of the response if desired. Examples of the rules involved in the above example can be outlined in pseudo-code as:

```
if (PROTOCOL == HTTP or PROTOCOL == HTTPS):
    if 'X-AspNet-Version' in DATA or 'X-Powered-By: ASP.NET' in
    DATA:
        return {'SOFTWARE VERSION': 'Microsoft IIS'}
if (PROTOCOL == HTTP or PROTOCOL == HTTPS):
    if 'CF-RAY' in DATA or 'Server: cloudflare-nginx' in DATA:
        return {'HOSTING PROVIDER': 'Cloudflare'}
if (PROTOCOL == HTTP or PROTOCOL == HTTPS):
    if DATA =~
    /<img.+?src="http[s]?:\/\/\/www.facebook.com/tr?id=(\d+)/:
        return {'SOCIAL NETWORK': {'NAME': 'Facebook',
        'IDENTIFIER': $1}}
```

Rules of this kind and others could be implemented more efficiently by using regular expressions. Use of regular expressions would avoid reprocessing the same data repeatedly, make the rules more agnostic to variations due to client characteristics, and enable matching against many variations and versions of the software (e.g., ASP) using a smaller number of rules. Also, the cited examples may not be the most reliable indicators of the demonstrated results (e.g., Microsoft IIS, Cloudflare). Each rule should be tested and evaluated to confirm its reliability before the rule is made active.

The approach described above can be extended beyond HTTP to, for example, HTTPS (using DNS name fields in certificates, subject names, and issuer names, CRLs, and OCSP URLs, for example), SMTP (using MX record domain names, their resulting list of hosts from the MX query, and the IP addresses of those MX hosts), Name Servers (using name servers hosts, and their IP addresses), VPN gateways (using hosts, and their IP addresses), SPF records (using include and redirect mechanisms and the IP mechanisms defining allowed hosts), and to others.

As noted earlier, this phase of processing in which rules are applied to data in a transaction (which we sometimes refer to as fingerprinting) can also be performed at the interface of the collector.

Asset Types

The fingerprinting process therefore enables the system to identify assets associated with servers. Among others, the following types of assets can be identified and used in generated edges between entities in the graph database. This list is not comprehensive and is not static. A very wide variety of asset types and a changing variety of them can be identified using the rule engine. These types of technology assets are mapped to entities, such that the entities that provide the technologies will have the attributes similar to those of other entities.

Mail Servers

We use the term mail server broadly to include a wide variety of servers that service email and similar messaging functions, including Mail Submission Agent (MSA), Mail Transfer Agent (MTA), Mail Exchange (MX), and Message Delivery Agent (MDA). Each of these examples plays a different role within an entity, and entities may use different software for each type, combine types together, have some of them hosted by a third-party, or have all of them hosted by the third-party, or combinations of those approaches. An entity could also host its own server.

Internet Service Providers

By utilizing IP registration data from the Internet Registries in combination with the transactions that occur over the Border Gateway Protocol (BGP) protocol; the service providers, direct peers, and peers of the service providers of individual organizations can be determined, and the dependencies can be determined.

BGP is the primary protocol responsible for routing traffic across the Internet between entities. The entities are connected to the Internet either through partnerships with Internet Service Providers or by those ISPs providing "transit" for entities who would purchase bandwidth and IP assignments from the ISPs as a transaction. Internet Service Providers, and other entities that may not be providing transit to other companies, can directly interconnect among each other using the BGP protocol ("peering"), which often does not involve a financial exchange.

Effective vendor (service) edges can be created from these relationships (e.g., the entities depend on their direct peers for a subset of their Internet traffic) and another set of edges can be created when a BGP hijack data feed is integrated in.

A disadvantage of the BGP protocol is that there is not a mechanism that allows receiving routers to authenticate or verify advertised routes. A hijack typically happens when an accidental, or malicious, advertisement propagates further than it normally should have. This can happen for a number of reasons, including a mistake in a configuration, political situations, or targeted attacks. At this point, the AS that is advertising that prefix now has traffic coming inbound into one of its routers on its network, such that it now can act on the traffic however it wishes, such as performing a man-in-the-middle attack, dropping it, or more often than not, re-routing the traffic to the appropriate destination.

The combined set of data could compose into a series of common questions, such as: "Which of the portfolio entities have sustained significant outages?", "Which entities have had traffic routed through this suspicious ISP known for spamming?", "Which entities only utilize one service provider?", "Which websites that my users accessed had their traffic intercepted by an untrusted party?", and many others.

Client Browsers

Assets for which information can be collected include user devices. One type of asset (and related transactions) that focuses on a device used by a human actor are the assets (and related transactions identified as client browsers. This is a passive collection type of asset (and transactions) as the identification would be only on the client and its activities. The actions of an active collector would be generated by the active collector under its own parameters. An active collector also does not realistically capture a broad population, nor would the active collector have associative information (such as IP addresses) that would allow it to relate the collected information back to a node other than the active collector.

However, a client browser that is identified through passive collection can reveal possible edges associated with vendor entities (such as operating system, browser, plugins, extensions, and software) and vulnerabilities.

For example, as shown in FIG. 17, a client is connecting to www.example.com; as part of the HTTP protocol, the client sends what is known as a user agent to the server. This reveals two important pieces of information: an edge for an operating system vendor (e.g., Mac OS X 10.9.5) and a browser vendor (e.g., Chrome 48.0.2564.109). Additional edges could be created based on whether these versions are at risk of vulnerabilities.

VPN Gateways

This asset type plays a separate, and important role, because a VPN gateway is associated with a vendor entity because different vendors develop or manufacture equipment used as VPN gateways. Therefore the identity of the vendor entity can act as a vendor edge between two entities. In addition, external users of an entity (e.g., employees of a company) can be identified (through passive collection) as they would be establishing direct connections to this device over IPsec or HTTPS in order to access resources internal to the network. This collected information can be used to identify edges between nodes of networks that have had access to internal resources of the network.

The VPN gateway is an egress point for traffic coming into and out of the network, and thus has attributes of the NATs, PATs, and Proxies categories. Thus, the outbound connections from VPN gateways are much like the traffic observed from NAT, PATs, and Proxies (internal traffic from inside the corporate (entity) network contacting external resources outside the network, such as websites). This information would then be used for additional edge generation, like the examples mentioned in the section on websites.

Using information from VPN gateways, edges can be generated representing vendors, vulnerabilities, management solutions, and external networks accessing DMZ, and can provide source for other edges.

Physical Locations

Certain transactions over the various TCP/IP application protocols may reveal information unrelated to the device serving the content, which can be used by the system for other purposes.

In this case, physical locations can be collected automatically from natural language processing of website responses or as part of the registration information for CIDRs and domains, manually collected as part of the creation of the entity maps, or aggregated from official and unofficial business databases provided by government entities or private organizations. These physical locations can be used similar to the other asset types when considering risk, particularly of importance for determining if there are a number of third or fourth parties with common locations, or if a particular location is impacted by a natural or unnatural disaster or event. Thus, in some cases business risks can be associated with geographical considerations, including risks of a supply chain interruption associated with a particular geography.

Other Types of Assets

The system can also identify the following types of assets. SSL certificates and certificate authorities (to identify edges that represent vendor relationships, and to identify vulnerabilities including insecure ciphers); domain infrastructures (to identify edges that represent vendor relationships (e.g., name server software, registrars); vulnerabilities and as source for other edges); proxies and NATs/PATs (to identify edges representing vendors, vulnerabilities, and as source for other edges); VPN gateways (vendors, technologies, authentication and cryptographic preferences), routers and switches (to identify edges that represent vendors, vulnerabilities, and management solutions) mobile device management solutions (for vendors and vulnerabilities), stateful firewalls (for vendors and vulnerabilities), file exchange and sharing services (e.g., Sharepoint, for vendors and vulnerabilities), chat and instant messaging services (e.g., Lync, XMPP, for vendors and vulnerabilities), wireless BSSID and SSIDs, exposed infrastructure (e.g., cameras, CMS, controllers, VMware ESX boxes, for vendors and vulnerabilities), and physical locations. In some cases business risks can be associated with geographical considerations, including risks of a supply chain interruption associated with a particular geography.

Data Flow

As suggested earlier, data that is retrieved from a variety of sources can be stored in raw form, then parsed for significant information which is then represented in information stored in the graph database. Nodes and edges of the graph database are used to represent different attributes of the parsed data. The graph database can be queried to discover patterns (for example, using rules) and a wide variety of other information about entities, assets, and their relationships. The significance of pattern matches can be assessed by the system and prioritized for display and notification. Users can use the display and notifications in various formats including tabular displays and visualizations. The displays and visualizations can be employed and navigated by a user to assess business relationships with its vendors and the vendors of those vendors to as many levels deep as is helpful or necessary.

Entity Maps

As mentioned above, entities, assets, and relationships can be modeled as nodes and edges of a graph database. Each node and edge stored in the database is associated with attributes of the represented entity, asset, or relationship. For example, for an entity, the attributes can include the name of the entity, its industry, a rating such as a BitSight® rating, type 4 GUID as a universal identifier, employee count, logo, locations, primary domain/url, description, and stock symbol, among others. Domains as assets can have attributes such as a name, registration start and end dates, which domain registrar provides it, whois information including the contact name, company, address, phone number, and emails for the registrant, and designated name servers.

Figure 7:
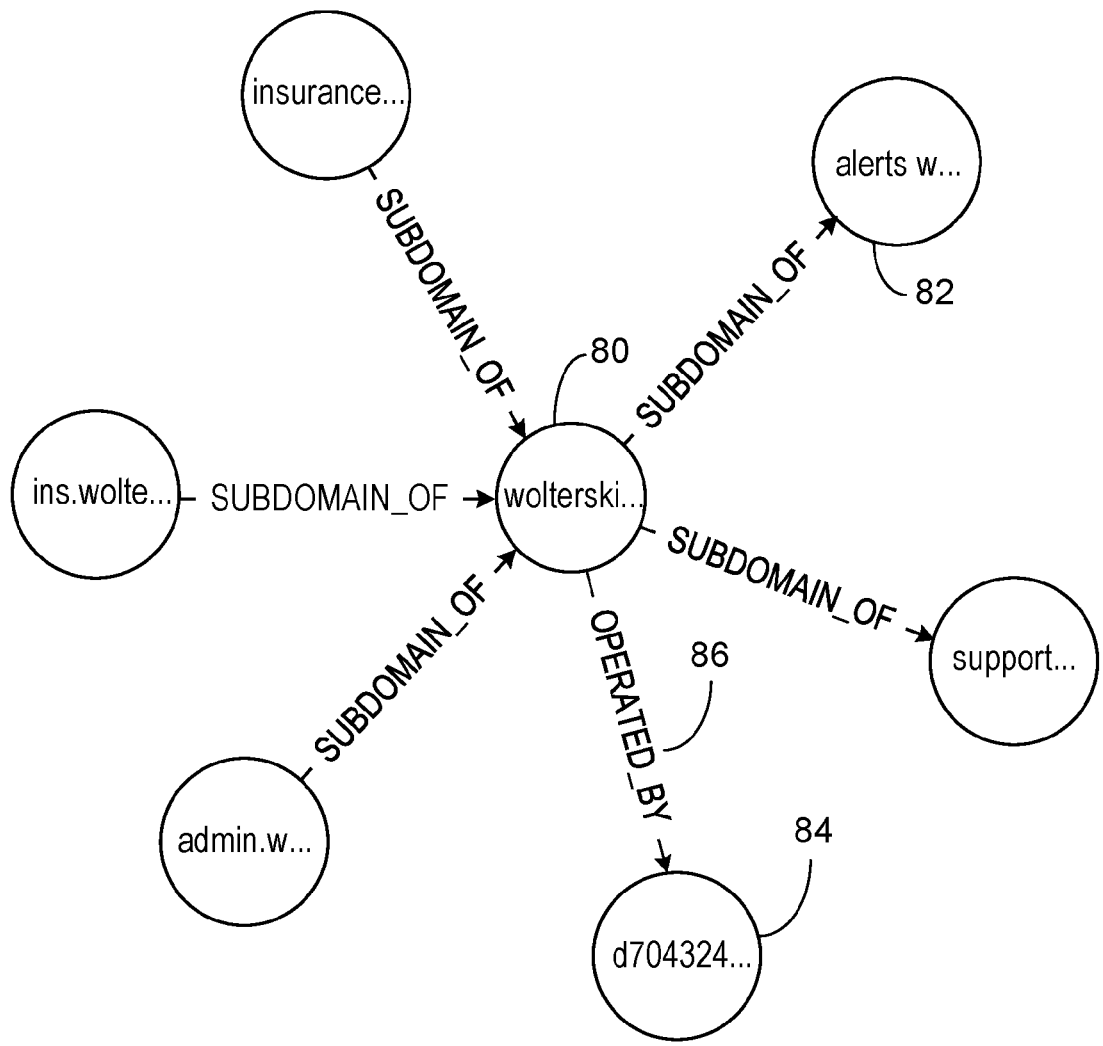
FIG. 7 is a block diagram of relationships.

As shown in FIG. 7, in the graph database, information can be stored that captures relationships among domains including the relationships of super domains 80 to their subdomains 82 and to entities 84 that operate (are responsible for) them.

Classless Inter-Domain Routings (CIDRs) as assets can have attributes such as registration dates and actual IP ranges. CIDRs are related in the graph database to entities to indicate who operates (has responsibility for) them. CIDRs include attributes such as registration start and end dates, the actual IP ranges, which registrar is responsible for assigning that range of IP addresses, whether the IP addresses are for v4 or v6, and in which country the IP addresses are located. in-ddr.arpa records for ipv4 and ip6.arpa records for ipv6 are used to perform reverse DNS queries, to determine which domain name is associated with an IP address. These ARPA records are modeled to point from domains associated with entities to IP addresses within registered CIDR blocks.

Entities can have technical assets mapped to them, such as IP addresses/CIDR blocks (groups of IP address that are assigned by regional registrars) and domains. In the graph database, entities that are related to each other, such as in a parent-child (subsidiary) relationship or an investment relationship, are connected by edges to represent those relationships. Both parent-child and investment relationships have attributes that can include start and end dates, and investment relationships can have percentage of ownership as an attribute. The GUID allows lookup in the graph database or in an entity database of all details of the events that impact an entity's rating.

In the graph database, relationships are stored that record domains that are related to each other and to indicate their domain/subdomain relationship. The relationship of a domain and the entity that operates it is also stored.

In FIG. 7 and in the graph database, the relationship between the super domain 80 and the entity 84 that operates it is represented by the OPERATED_BY edge 86, which also has attributes such as start and end dates.

Attributes of certain assets in the graph database can be determined by the fingerprinting process described earlier.

Websites

Fingerprinting of website attributes can identify technologies (assets) being used and relationships of the assets to entities that provide them. The attributes can include:

1. Assets (images, javascript, style sheets videos, audio files, and any other types of files that would be included as part of a website including downloadable such as PDFs, documents, spreadsheet, CSV files) hosted on a Content Delivery Network (CDN), such as Akamai, Rackspace CDN, AWS CDN, MaxCDN.
2. Analytics and sharing platforms, such as Google Analytics, Omniture, Shareaholic, Optimizely.
3. Widgets that are embedded in the website for additional functionality such as customer support, sharing, and fonts, such as UserVoice, ShareThis, Google+, fonts.com
4. JavaScript libraries, such as jQuery, SWFObject, jQuery mobile.
5. Ad tracking platforms, such as DoubleClick, Atlas, AppNexus.
6. Web application frameworks, such as WordPress, Ruby on Rails, Dreamweaver, Microsoft Sharepoint.
7. Webmaster tools to help manage the website, such as Google Webmaster, MSN/Bing Webmaster, Yandex.
8. eCommerce platforms, such as Magento, IBM Websphere Commerce, Squarespace.
9. Media platforms, such as Brightcove, Wistia, Vimeo.
10. Geo related packages, such as Google Maps, Maxmind.
11. Technologies that provide feeds of data, such as Feedburner.
12. Payment processing, such as Stripe, VISA, MasterCard, PayPal.

In addition, observations of headers of responses of web servers can be used to identify server side technologies and relationships such as Web server technology, such as Apache, nginx, IIS; and server side platforms, programming languages, and libraries, such as Ubuntu, PHP, OpenSSL.

Websites can be viewed as any device using the HTTP protocol to serve content that is to be rendered with and interfaced by a common web browser, even though there are devices that serve content using the HTTP protocol whose purpose is not to be directly interpreted by a common web browser. Websites, if no other identifying information can be gleaned from its content, might be considered to be within a fallback asset category. For example, a given IP address that is observed hosting an IPSec or SSL VPN service, might be considered to fall within a VPN gateway asset category even though it also uses the HTTP protocol; or it might also have been identified because it also allows management through a web console, for example, to allow an administrator to manage and configure it.

Even if a website is not detected an asset, it would likely have other classifications that would provide more context into how a user interacts with it, or more importantly the content it provides. As we discussed in the section on fingerprinting components for identification section, one example included interpreting responses from the device, and in one example it was possible to identify descriptive keywords about the website. This would not be the only opportunity for classification as the real response from the server is often much more lengthy than that shown in the example, and includes interactive elements (e.g., buttons, web forms, internal web links, external web links, e.g., to Facebook to "Like" the page) that exist only in the context of that one webpage. As discussed in the passive and active collection sections, that might not be the only webpage that a user would visit when conducting an HTTP transaction (e.g., a user might visit the homepage of a retail website, and then view specific product categories) such that in order to most effectively identify a server, the system best makes use of all its available content, and all its available web pages.

There are many aspects of a website that can be identified and categorized, such as:
1. Website purpose and descriptive keywords. (e.g., "retail", "banking", "media", etc)
2. Target audience. (e.g., "people who speak french", "americans interested in politics", etc)
3. Available actions. (e.g. Ability to submit comments, Like the website on a Facebook page (and thus revealing a connection between the website owner and their Facebook page), Notion of a user account, etc)
4. Vulnerable technologies and malicious content. (e.g., Website susceptible to attack and exposure of user information due to use of out-of-date versions and technologies, Website inadvertently might be serving malware through ad networks, etc)

For example, an active or passive collector might discover a login form on another page, but also detect that it's insecurely configured, and could reveal the user's password to local adversaries if they attempted to login. Alternatively, the server might be using older technologies that are vulnerable to attack and thus an attacker might get access to the database of the website and now have personal information for all the users. To complete this example and how this connects two nodes through an edge, we might discover that a user from "Organization B" visited a website belonging to "Organization A", but that website is insecurely configured and opens up risks to users of "Organization B", and more importantly to all organizations (or nodes) accessing the website of "Organization A" whose content is now at risk from "Organization A" poor configuration of their systems. Thus, if the node of the website is viewed and then all edges representing visitors are viewed, the results would show the organizations at risk by using this website maintained by "Organization A". Alternatively, all edges of a certain type can be returned for a node ("Organization B"), so one could view the combination of edges that represent viewing high-risk websites connected to "Organization B" and thus be returned with a data set that shows all websites viewed by users of "Organization B" and appropriate mitigation can take place.

Another brief example includes using purely the identified descriptive keywords of websites to create edges between nodes. For example, if a website has been identified as "payment processing", and is hosted by "Organization A" and many users from "Organization B" are seen through passive collection to often visit that website, then there might be a higher-level relationship between "Organization A" and "Organization B" in that the former might be the vendor for payment processing at "Organization B". This asset type is very rich in the variety of edges that could develop between organizations.

SSL Certificates

SSL certificates rely upon a chain of trust. When issued they are issued for a list of domains for which they are considered valid. They can be used to determine relationships with issuing authorities along the chain of trust. They can also be used to determine the impact of a compromise somewhere along the chain of trust.

Figure 8:
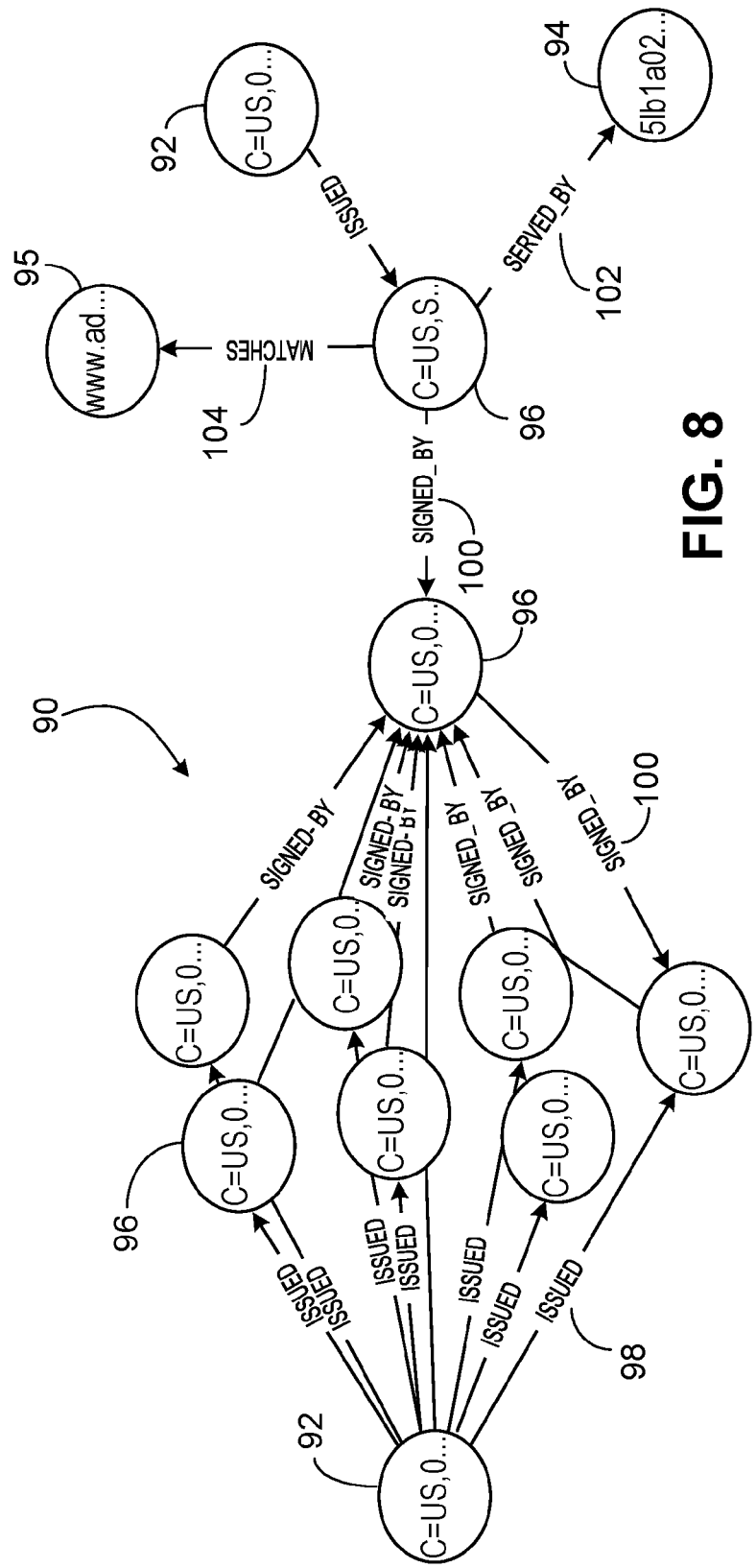
FIG. 8 illustrates a certificate chain.

As shown in FIG. 8, an example of an SSL certificate chain 90 shows relationships among entities, certificates, certificate issuers, and domains that can be captured in the graph database.

The FIGURE illustrates nodes that represent SSL certificates 96, nodes that represent SSL certificate issuing authorities 92, and a node 94 that is an entity that served 102 the connected SSL certificate. In the graph database, SSL certificate nodes include attributes such as the subject name, the serial number, valid after and before dates, the signing algorithm, the key algorithm, and the key length. The signing chain is captured as the SIGNED BY edges 100 of the graph. Domains 95 for which the certificates match are captured through the MATCHES edges 104 of the graph. Certificate authorities include attributes such as their names. The issuing of SSL certificates by those authorities is captured through the ISSUED edges 98 of the graph.

DNS

Querying the Domain Name System can reveal a lot about which technologies (assets) and relationships that domains are using, and therefore the entities that operate (are responsible for) those domains. Different types of DNS records can be used to discover different kinds of relationships. For example:
1. CNAME (canonical name). The CNAME record acts as an alias for another domain. Entities commonly set up CNAME records to point to third party solutions for support, hiring, management of legal documentation, content delivery networks, and other functions. As shown in the example of FIG. 9, the subdomain (asset) jobs.thesun.co.uk 110 has a CNAME record 112 pointing to subdomain (asset) thesunjobs.madgexjb.com 114, indicating that The Sun is using Madgex Job Board Technology as a vendor. The CNAME relationship 112 is represented as an edge between two domain nodes and has attributes such as start and end dates.
2. A (address) (and AAAA for IPv6). This type of record is used to lookup an IP address for a domain name. The record can indicate who is providing hosting for the domain by identifying to whom the IP address belongs, either through Whois information or through existing entity maps. For example, bitsighttech.com has an A record pointing to 104.25.119.20. Performing a Whois lookup for that IP address shows that CloudFlare is being used for hosting the site.
3. MX (mail exchanger). This type of record specifies mail servers (assets) responsible for accepting messages for a domain. The record often can indicate which technologies (assets) and vendor (entity) relationships are being used for accepting and sending emails for a domain and its operating entity. As shown in the top example of FIG. 10, the subdomain support.twitterfeed.com 120 has an MX record 122 indicating that the subdomain mail.zendesk.com 124 can accept messages for itself. This demonstrates that Zendesk is being used for support and processing emails. In the bottom example, promo.fullbeauty.com 126 has an MX record 128 indicating that aspmx3.googlemail.com 130 can accept messages for itself. This demonstrates the use of google mail (likely google apps for business). Edges of type MAIL_EXCHANGER_FOR are used to indicate this relationship between domain nodes.

4. NS (name server). The name server record indicates who is the authority for a DNS zone. The record can indicate a relationship with a vendor (entity) for managing DNS for a domain. As shown in the example of FIG. 11, bit9.com 136 has 4 NS records, pdns74.ultradns.net 138, pdns74.ultradns.org 140, pdns74.ultradns.com 142, and pdns74.ultradns.biz 144, indicating a relationship with UltraDNS. Edges of type NAME_SERVER_FOR 146 are used to indicate this relationship between domain nodes.

5. TXT (text). The text record can serve many purposes. One example is to place verification keys for different services, such as Microsoft Office 365, Google Apps. This type of verification key can indicate the user of a particular service. For example, bit9.com has keys for both Microsoft Office 365 and Google Apps: MS=ms86512154; MS=ms34764533; and google-site-verification=jxs BCZuyLi83zh2sCGLhyevgfRNHJ9bH1bAASMA1668.

6. SPF. Send Policy Framework (SPF) records are used to indicate which parties are allowed to send email on behalf of an entity. This can be done by specifying, using DNS records, for example, IP addresses, domain names, and other SPF records to include. Receiving mail servers verify that the sender is included in these authorized senders and if not marks the message as spam. Any referenced authorized senders that are not the entity itself are explicitly third party vendors (entities). For example, the SPF record for bitsighttech.com is v=spf1 mx include:_spfgoogle.com include:amazonses.com include:sendgrid.net ~all which indicates authorized senders as google.com (indicating that BitSight uses Google Mail), Amazon Simple Email Service (indicating something from AWS, Amazon Web Services, sends email on behalf of bitsighttech.com), and SendGrid. These are all indicative of business relationships that BitSight has with these third parties (entities).

Press Releases, Public Disclosures, Press Releases, and Financial Filings

Self-disclosure by entities, whether for PR purposes or regulatory filings, is a non-technical source of entity relationship information that can be used by the system.

An example of such a press release is the following one about Oracle, indicating that CLK Enerji will be using "Oracle Utilities Customer Care & Billing (CC&B) and Oracle Utilities Meter Data Management (MDM)": https://www.oracle.com/corporate/pressrelease/CLKEnerji-Selects-Oracle-Utilities-012116.html.

Another source is SEC 10-Ks, which can be used to identify acquisitions and risk factors related to business relationships. As an example a 10-K for Cimpress called out their ownership percentages of acquisitions, starting on page 58: https://www.last10k.com/sec-filings/CMPR/0001262976-15-000008.htm: "On Apr. 15, 2015, we completed our acquisition of 70% of the shares of Exagroup SAS, a French simplified joint stock company" "On Jul. 1, 2014, we acquired 100% of the outstanding shares of FotoKnudsen AS, a Norwegian photo product company focused primarily on the Norwegian markets" "On Apr. 9, 2015, we acquired 100% of the outstanding shares of FL Print SAS (which we refer to as Easyflyer), a French web-to-print business focused primarily on large format products" "On Apr. 17, 2015, we acquired 100% of the outstanding shares of druck.at Druck-und Handelsgesellschäft mbH (which we refer to as druck.at), a web-to-print business focused primarily on the Austrian market"

An example 10-K for IBM (starting on page 3), called out entities using their products or platforms as well as partnerships that could suggest an exchange of data or shared usage of platforms or technology: https://www.last10k.com/sec-filings/IBM/0001047469-15-001106.htm: "The IBM Cloud is the most powerful choice for enterprise-grade environments—bringing unparalleled levels of security, performance and scalability. As a result, in 2014, IBM formed a strategic alliance with SAP to run its business applications on IBM's cloud" "Together, IBM and Apple are joining forces to bring the ease-of-use of personal apps to the enterprise environment" "IBM supports its clients' mission critical processes, and remains the "go-to" platform for the enterprise. For example, more than 90 percent of the top 100 banks and the top 25 U.S. retailers run on IBM systems. In addition, nearly half of the Fortune 100 companies outsource IT operations to IBM. The company's leadership in enterprise computing provides the foundation for strategic partnerships as leading companies want to work with IBM, as evidenced by the Apple, SAP, Twitter and Tencent partnerships announced in 2014."

Natural Language Processing (NLP) can be used to process the press releases, public disclosures, court records, press releases, resumes, and financial filings to identify potential entity relationships, acquisitions, and partnerships. Maps for entities that are included in the graph database can be connected to each other through relationships, such as ownership, with start and end dates and percentage. For other entity relationships and partnerships it may be possible identify the type and include a confidence value as attributes of the edge between the related entity nodes. The original document could also be stored with a link to the source.

Architecture

As shown in FIG. 18, in some implementations, the architecture of the system 299 is organized as follows. There is a service that is responsible for ingesting 300 the data that is used to generate the graph as well as maintaining it 304 through any necessary updates (Business Relationship Data Service 302 in the below diagram, BRDS). There is a service 310 that is responsible for matching patterns against the data in the graph database 312 using any additional required data, such as which entities the user has access to 314, in order to return relevant business relationships and technologies (assets) being utilized (Business Relationship Interrogation Service in the below diagram, BRIS). Any application 316 can query 317 the Business Relationship Interrogation Service for entity relationship data. The customer facing product can be a standalone web application 318 with tabular and graphical data (Business Relationship Insights in the below diagram, BRI) which makes requests 320 to BRIS APIs. The returned data 322 includes the necessary entity relationship and technology (asset) data in order to render the tabular and graphical representations.

The Business Relationship Interrogation Service (BRIS) matches patterns against the graph database to return relevant business relationship data. Patterns can begin with entities (e.g., BitSight entities) and can return providers (service entities) or start with providers and return entities. The patterns can also begin with assets, such as domain or IP, and return entities and/or providers. The technology types can be constrained by combinations of the list above in the nodes and edges section.

Here are some example patterns that can be matched to answer questions:

1. Which are the key fourth-party entities whose security I should pay closer attention to given my current portfolio? (in this case the system can constrain technology types to payment providers, ecommerce software, SSL certificates, hosting providers, and DNS providers)
2. Which entities are running out of date [vulnerable] versions of WordPress?
3. Which entities are using external hosting providers? On which providers are they most dependent?
4. Which companies could be affected by an outage in the Amazon Oregon or Ireland regions?
5. Which companies could be affected by an UltraDNS outage?
6. Which companies use an e-commerce software package?
7. By company and e-commerce package, what is the count of domains running e-commerce?
8. Which companies accept online payments?
9. By company and payment processor, which is the count of domains accepting payments?
10. Which Certificate Authorities have root certificates with deprecated signing algorithms? Which companies could be affected?

Use Cases-Cyber Insurance Underwriting

Cyber insurance underwriters write policies for companies (entities) to cover a company's losses and damages arising from a cyber event. Typical events and their resulting losses and damages include the following.

Cyber breaches can result in a loss of data, which may in turn lead to lawsuits by impacted parties (entities), especially for loss of sensitive data like employee records or customer transactions. Loss of data may also depreciate the company's reputation, which can hurt future business. Outages can produce lost revenue. For example, failed hosting can lead to inaccessibility of a corporate network, storefront website, or provided electronic service (such as web hosting, API services, payment processing). Lost data can lead to a broken service level agreement (SLA) which can cause contractual penalties and loss of company (entity) reputation, which can hurt future business.

Insurance carriers maintain a portfolio of companies (entities) that they insure; the carrier tries to balance its risk across that portfolio. A worst case scenario might be a huge fiscal loss if many companies (entities) in their portfolio happen to depend upon or share sensitive information with a single other company (entity). Information in a graph database can indicate such a situation by identifying that a single entity is a fourth-party provider to many entities that are in a third-party relationship (as insureds) with the insurance carrier. The information in the graph database can be used by the insurance carrier to identify the unwanted risk. The information can be illustrated in an entity map through a graphical user interface.

Thus, given a list of companies (entities) that an insurer has underwritten and based on the business graph for that insurer, the system can identify points of aggregation risk (supplier entities that are used by a critical mass of companies in the list).

Also, given the list of companies and the insurance policies associated with each company, the system can produce a dollar value loss associated with a common supplier(s) to those companies failing or having their assets compromised.

In addition, the system can alert the insurer of changes to the aggregation risk profile of a portfolio either when portfolio composition changes (e.g., new companies are insured or some companies are not renewed) or when the system discovers changes in supplier relationships within the existing portfolio.

Given the list of companies of insurer A and based on the system's knowledge of the list of companies belonging to other insurers, the system can provide insights into the presence or absence of certain suppliers and the strength of relationships of those suppliers to companies in A's portfolio. For instance, the system could say that "for a portfolio of size x, Amazon is expected to be present in the business graph and to pose an aggregation risk value of y; however, Amazon does not actually appear in A's portfolio.

In some implementations, insurers (and other users) can contribute information to the graph by providing information on suppliers that companies use.

Use Cases-Information Security Management

Information security managers are typically in charge of creating, maintaining, and enforcing network security policies, as well as managing and documenting compliance with regulatory policies regarding sensitive data (like personal or financial records). The information available in the graph database and presented as an entity map through the graphical user interface can be used for a variety of purposes by information security managers, including the following examples.

The information security manager may use the information to audit a current vendor (entity) or to decide between potential competing vendors by evaluating, for example, the vendors' (third-party entities') vendors (fourth-party entities) and establishing whether there is something sensitive about whom the third-party vendors are doing business with. For example, if a fourth party entity (especially one who deals with sensitive information) has a history of breaches or demonstrates a low BitSight® security rating, the information security manager may choose not to do business with a vendor. The same decision could be made for a fourth-party entity that has a footprint in a country with little Internet regulation, political unrest, or more-than-average nefarious online activity.

Information security managers may use the information available from a graph database or from entity maps displayed using the information in the graph database to ensure regulatory compliance. Many regulations require an unspecific "good faith effort to monitor vendors and third parties". The system and techniques that we have described may be used to help fulfill that good faith effort, or to be rigorous about tracing the full path of a company's records. In some cases, regulatory compliance also means making sure that data is only being transmitted within certain companies (entities).

Use Cases-Informational Research

Researchers can utilize the graph database information in a variety of ways, including the following. In a consulting role, knowledge of the fourth-party ecosystem (and analysis from either of the prior two use cases) can help lead to recommendations for software or technology stack strategies for clients. In a research role, this information can be combined with any number of other sets of data, or even analyzed on its own, to draw conclusions about various entities or service providers.

Child-Node Display

When an entity map or business graph is displayed using the data available in a graph database, displaying all of the child nodes under each parent node that has children can be unwieldy and overwhelming for users, especially non-technically oriented users to explore. The entity map can have many thousands of nodes, and a child-node will typically have from 10-100 connections to other nodes. Among other things, the risks to an entity presented by its portfolio of third-party entities and fourth-party entities can be hard to visualize and understand from a full blown entity map. It is useful, therefore, to reduce the complexity of the presentation and to enable a user to highlight the biggest risks faced by an entity at a glance. The user would then be able to copy and paste graphical portions of the map that relate to those risks into a presentation deck to illustrate the impact of the risk for others.

As shown in FIG. 12, for these purposes the system implements the following features, among others. For purposes of display, multiple child nodes 150, 152 are condensed into a single parent node 154, based on their relationships with other entities. Only third-party entities are accumulated into a parent-node; fourth-party entities are always displayed as distinct nodes for easier readability and identification. As shown in FIG. 13, non-expandable parent nodes 156 instead display their contents and related metadata in a tabular format 158. In addition, an artificial ceiling can be imposed on the number of results of a given query that are included in the fourth-party ecosystem for a particular entity, so as not to overwhelm the users with results. As shown in FIG. 14, a highlighted parent-node 160 is displayed including all contained child-nodes (third-party entities) impacted by all fourth-party node connections. A table 162 is displayed showing the number and % of impacted assets.

In another example, as shown in FIG. 15, a fourth-party node 164 is highlighted, with an accompanying table 166 of all impacted third-party nodes, regardless of their other connections to other fourth-party entities.

Users can interact with the entity graph directly by clicking on each of the nodes, and by clicking between nodes (and edges) to view different metadata tables.

Additional information could be shown in the tables, including the following. The directionality breakdowns for each connection can be shown. The representation of amount of assets shared between two or more connections can be presented in various ways, for example, by variable line width or by color coding. A user can be enabled to dig deeper into a connection between a single third-party entity and a single fourth-party entity in the graphical user interface. A rating such as the BitSight rating can be integrated in the graph or the table for each of the displayed entities, to express relative security risk. The graph and table combination can be arranged to provide the user with an idea of how different portfolios of entities compare structurally and how they've performed historically.

Display of Risk Aggregation

Figure 19:
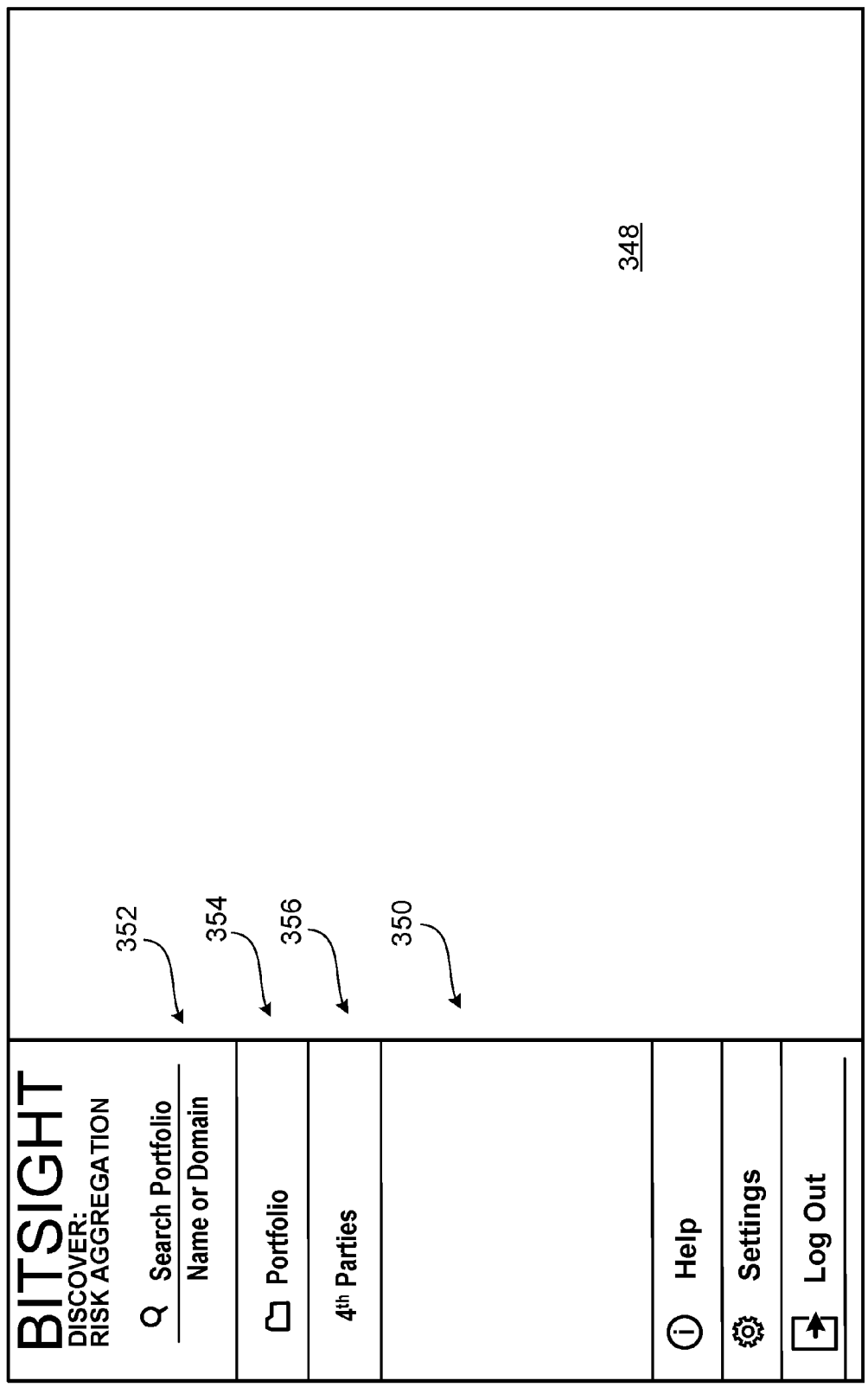

As shown in FIG. 19, in some implementations of a user interface presented in a web browser for viewing aspects of aggregated risks, a navigation bar 350 is presented on the left side of a webpage 348. The navigation bar allows the user to search for an entity by entering a URL in a search box 352. By invoking a portfolio button 354, the user can view risk associated with all entities that belong to a portfolio, for example, a portfolio of entities with which the user's company has third-party relationships, or a portfolio of entities chosen in some other way. By invoking a 4$^{th}$ parties button, the user is able to view information about risks associated with fourth-party entities.

Figure 20:
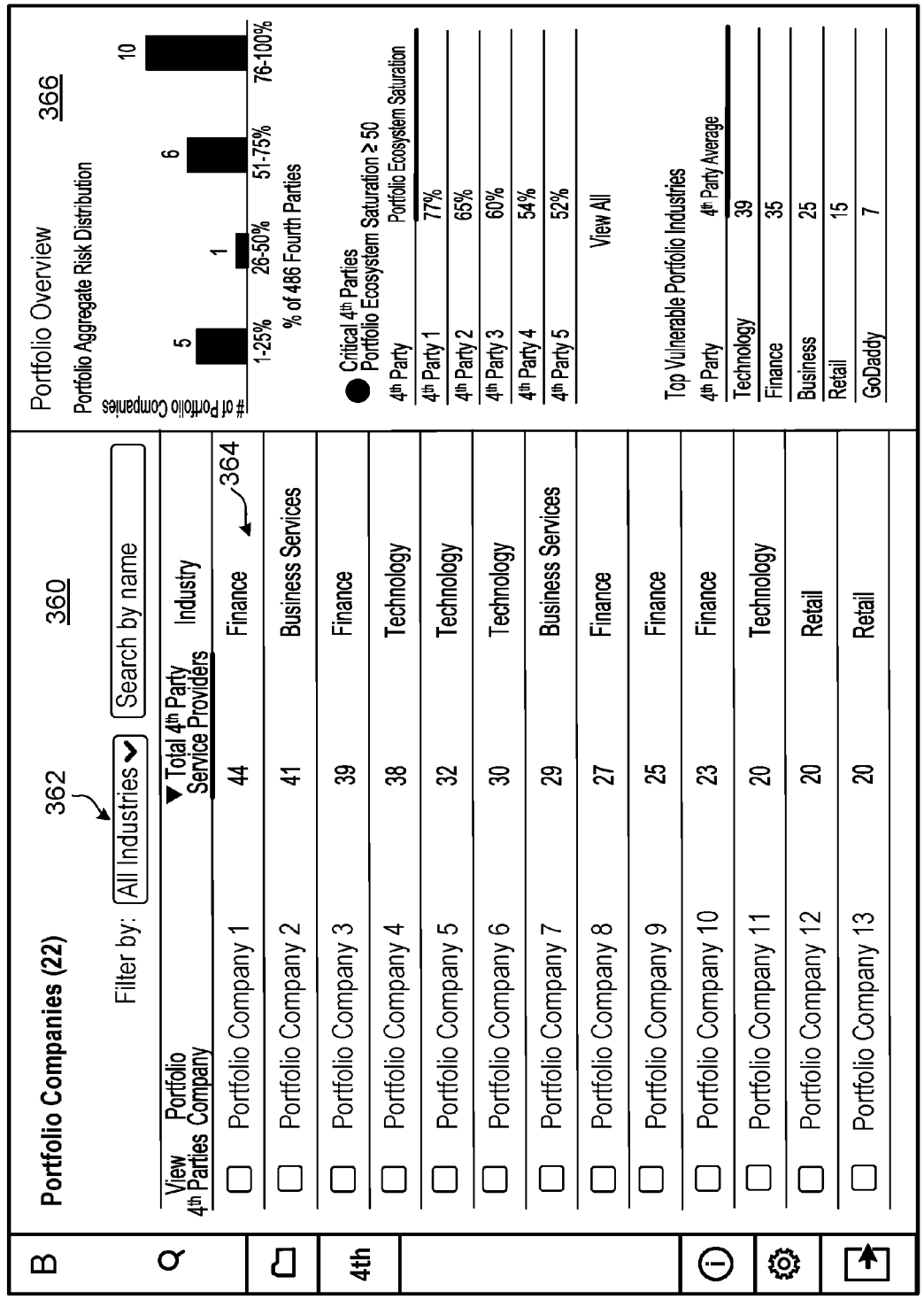

When the user invokes the 4$^{th}$ parties button, she is presented with the page 360 shown in FIG. 20. Initially there is a list of all of the entities that are in the portfolio, but the (hidden) query of the graph database that produced the information displayed on FIG. 20 can be adjusted indirectly by an easy to use filter feature 362 that enables a choice of a subset of all of the entities in the portfolio. Each entry 364 in the list of portfolio entities identifies the entity by name, gives the number of fourth-party service providers to that entity and identifies the industry to which it belongs. In the right-hand pane 366, information that helps the user to evaluate fourth-party risks is presented in graphical and tabular form. On the left side of each of the entries in the list of entities, is a check box. By checking the boxes the user again is indirectly and in a simple easy way altering an underlying, hidden, formal database query so that information about only the checked entities can be presented in the right-hand pane of the screen. The right hand pane presents information about fourth-party dependencies for the two companies based on the names of the fourth-parties, the services that they provide, and the % of impacted assets with respect to each of them.

Figure 22:
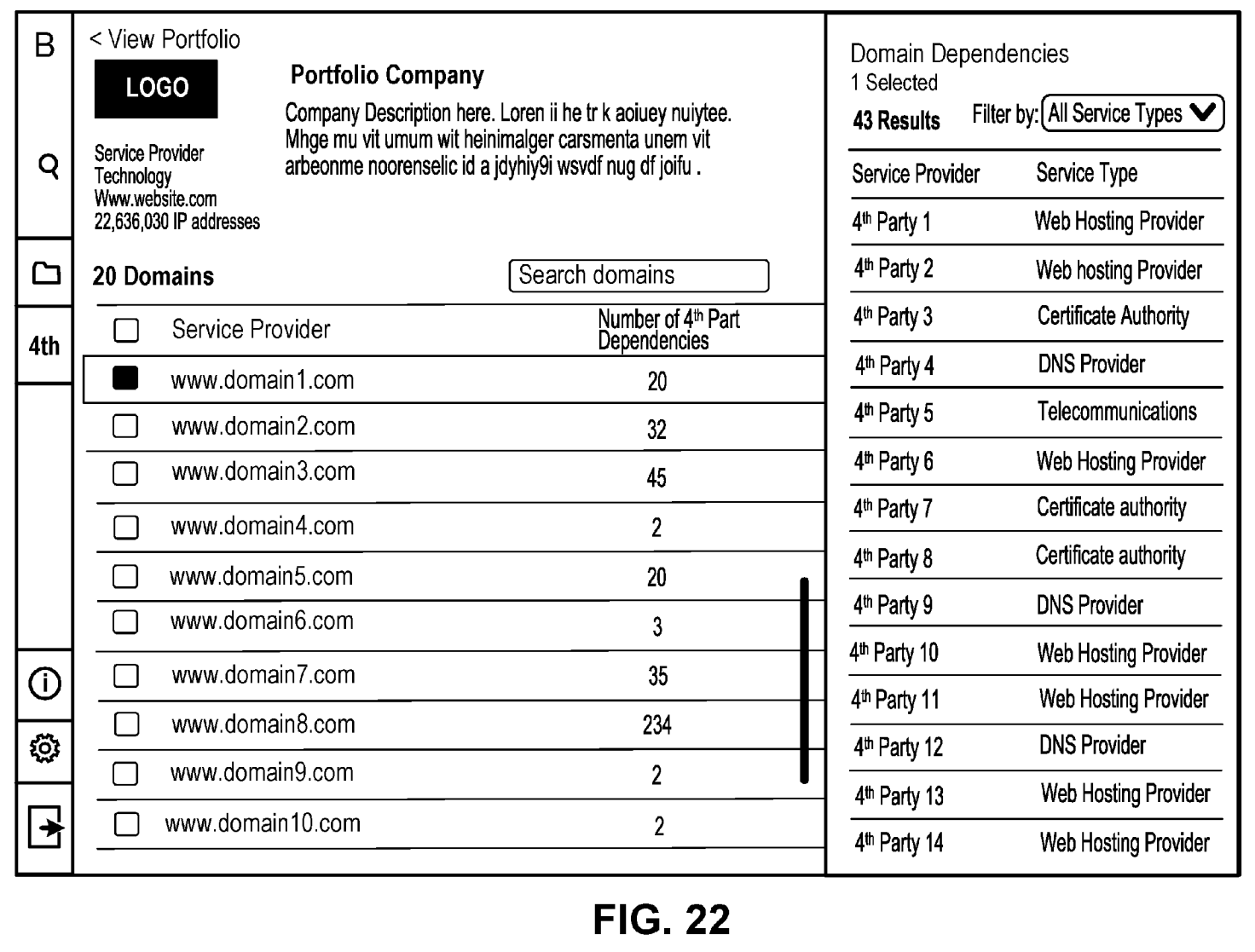

By invoking a single entry on the list of FIG. 20 or 21, for example, the entry for IBM, the user is presented with the page shown in FIG. 22. There detailed information associated with IBM is presented, including the domains that it controls. By checking a particular one of the domains, the right-hand pane of the page displays, for the selected domain, information that indicates the service providers and service types that relate to that domain.

Figure 23:
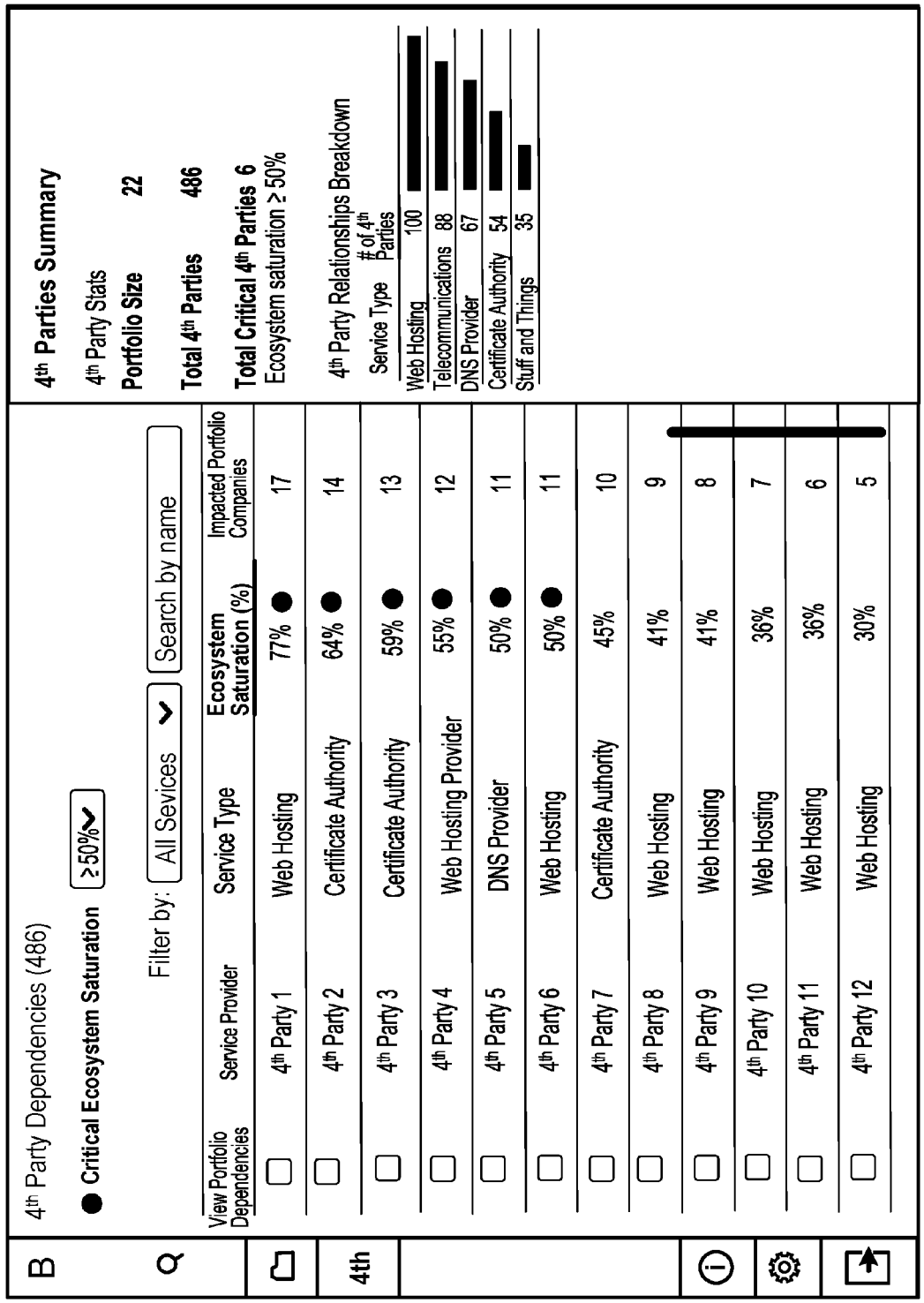

All of the FIGS. 21, 22, and 24 have filter controls in the upper right hand part of the right-hand pane. The filter controls enable quick, simple adjustment of an underlying query that is applied to the graph database, When the user invokes the 4$^{th}$ parties button on the navigation pane, the page of FIG. 23 is presented. That page illustrates fourth-party dependencies for all of the fourth parties associated with the portfolio. Each entry in the list includes an identification of a service provider, a service type for that provider, an ecosystem saturation percentage, and the number of portfolio companies impacted by that provider. The right hand pane presents summary information about the impact of fourth parties based on the types of relationships.

By checking boxes on the list, the user is presented with the page shown in FIG. 24 in which the right-hand pane shows the fourth party dependencies for the two third-party entities checked. For each of the fourth parties, the table indicates an asset risk percentage and a number of assets impacted.

Figure 25:

FIG. 25 illustrates the availability of information about any of the entities that are included in the graph database whether or not in the portfolio under consideration. The screen also enables a user to add the entity to the portfolio if it is not already a member.

FIG. 26 illustrates the availability of a knowledge database to help a user in the use of the system.

A wide variety of other approaches to the user interface would be possible.

Some implementations of systems and techniques described here may use features and products offered by BitSight Technologies of Cambridge, Mass.

Other implementations are within the scope of the following claims.

The invention claimed is:

1. A computer-implemented method comprising:
    displaying, through an interactive graphical user interface, information from a node-edge graph database, wherein nodes and edges from the graph database represent, respectively, assets of a portfolio of entities and relationships among the assets,
    identifying service relationships in which a common supplier is used by a plurality of entities within the portfolio of entities, based on, at least in part, transactions on the Internet between the common supplier and one or more entities of the plurality of entities, providing information indicative of a cyber-security risk to a principal entity associated with the plurality of entities based on the identified service relationships, wherein the cyber-security risk comprises an aggregated risk based at least in part on the common supplier used by the plurality of entities, displaying controls enabling a user to apply a database query corresponding to the identified service relationships to the graph database without the user formulating the database query, and graphically displaying nodes and edges that result from applying the query to the graph database.

2. The method of claim 1 in which the provided information includes information automatically derived from sources external to the entities.

3. The method of claim 1 in which the provided information includes information derived from two or more sources.

4. The method of claim 1 in which the provided information includes information derived from publicly available documents.

5. The method of claim 4 in which the publicly available documents comprise public filings, disclosures, or resumes.

6. The method of claim 1 in which the cyber-security risk comprises a service outage caused by the common supplier.

7. The method of claim 1 in which the cyber-security risk comprises a technology breach caused by the common supplier.

8. The method of claim 1 in which the displayed information is indicative of an extent of the cyber-security risk.

9. The method of claim 1 in which the displayed information comprises information organized based on a type of one or more of the service relationships.

10. The method of claim 1 in which the displayed information comprises information indicative of a business risk for each entity of the portfolio of entities with respect to one or more of the service relationships with the common supplier.

11. The method of claim 1 in which the displayed information comprises information from which the principal entity can balance its cyber-security risk across the plurality of entities.

12. The method of claim 1 in which the principal entity comprises an insurer.

13. The method of claim 1 in which the service relationships comprise at least one of website hosting, email management, SSL certificate authorities, payment providers, DNS providers, analytics providers, or content delivery network providers.

14. The method of claim 1 in which the entities that belong to the portfolio of entities are identified by a user.

15. A computer implemented method comprising:
receiving, through a communication network, information identifying a portfolio of business entities with which a principal entity has a business relationship, displaying, through an interactive graphical user interface, information from a node-edge graph database, wherein nodes and edges within the graph database represent, respectively, assets of the portfolio of entities and relationships among the assets, identifying service relationships in which a common supplier is used by a plurality of entities within the portfolio of entities, based on, at least in part, transactions on the Internet between the common supplier and one or more entities of the plurality of entities, based on the information identifying the portfolio of business entities and the identified service relationships, querying the graph database to identify (i) the common supplier that provides technology services to the plurality of entities and (ii) a category of technology services to which the common supplier belongs, graphically displaying nodes and edges that result from querying the graph database, and based on the results of the query, determining risks to the principal entity associated with the provision of the technology services by the common supplier to the plurality of entities wherein the determined risks comprise an aggregated risk based at least in part on the common supplier used by the plurality of entities.

16. The method of claim 15 further comprising reporting the determined risks through the communication network for use in displaying the potential determined risks to a user.

17. The method of claim 15 further comprising displaying actions to balance the risks across the portfolio of entities and reduce risk to the principal entity.

18. The method of claim 17 in which the principal entity comprises a carrier of insurance risk.

19. The method of claim 1 further comprising providing a dollar value loss associated with the common supplier.

20. The method of claim 1 in which the transactions on the Internet is between a server or client of the common supplier and a server or client of the one or more plurality of entities,
wherein the client performs at least one of the group consisting of: initiating a session, requesting a resource, and submitting data; and
wherein the server performs at least one of the group consisting of: responding to a request by the client to initiate a session; responding to the request for a resource by the client; and storing data sent by the client.

21. The method of claim 15 in which the transactions on the Internet is between a server or client of the common supplier and a server or client of the one or more plurality of entities,
wherein the client performs at least one of the group consisting of: initiating a session, requesting a resource, and submitting data; and
wherein the server performs at least one of the group consisting of: responding to a request by the client to initiate a session; responding to the request for a resource by the client; and storing data sent by the client.

* * * * *

UNITED STATES PATENT AND TRADEMARK OFFICE
CERTIFICATE OF CORRECTION

PATENT NO.       : 10,176,445 B2
APPLICATION NO.  : 15/089375
DATED            : January 8, 2019
INVENTOR(S)      : Nagarjuna Venna et al.

It is certified that error appears in the above-identified patent and that said Letters Patent is hereby corrected as shown below:

In the Claims

In Claim number 16, at Column 32, Line number 26, please delete "potential".

Signed and Sealed this
Twentieth Day of August, 2019

Andrei Iancu
*Director of the United States Patent and Trademark Office*